(12) United States Patent
Elshafie et al.

(10) Patent No.: US 12,316,420 B2
(45) Date of Patent: May 27, 2025

(54) BEAM RESTRICTION CONSIDERATIONS IN PRESENCE OF A RECONFIGURABLE INTELLIGENT SURFACE

(71) Applicant: QUALCOMM Incorporated, San Diego, CA (US)

(72) Inventors: Ahmed Elshafie, San Diego, CA (US); Saeid Sahraei, San Diego, CA (US); Yu Zhang, San Diego, CA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 17/568,682

(22) Filed: Jan. 4, 2022

(65) Prior Publication Data

US 2023/0216572 A1 Jul. 6, 2023

(51) Int. Cl.
*H04B 7/06* (2006.01)
*H04B 7/0426* (2017.01)
*H04W 16/28* (2009.01)
*H04W 72/542* (2023.01)

(52) U.S. Cl.
CPC ........... *H04B 7/0695* (2013.01); *H04B 7/043* (2013.01); *H04B 7/0617* (2013.01); *H04W 16/28* (2013.01); *H04W 72/542* (2023.01)

(58) Field of Classification Search
CPC .... H04B 7/0695; H04B 7/043; H04B 7/0617; H04W 72/542; H04W 16/28
See application file for complete search history.

(56) References Cited

U.S. PATENT DOCUMENTS

| 2021/0302561 | A1* | 9/2021 | Bayesteh | G01S 5/0273 |
| 2021/0384637 | A1* | 12/2021 | Sciancalepore | H01Q 15/148 |
| 2022/0014935 | A1* | 1/2022 | Haija | H04L 5/0048 |

* cited by examiner

*Primary Examiner* — Duc C Ho
(74) *Attorney, Agent, or Firm* — Loza & Loza, LLP/Qualcomm Incorporated

(57) ABSTRACT

Various aspects to reduce interferences in presence of a reconfigurable intelligent surface (RIS) are provided. In an aspect, a first device perform a first transmission using a first set of beams of the first device in response to an activated RIS for serving a second device to facilitate communication between the first device and the second device not being present. The first device may further perform a second transmission using a second set of beams of the first device in response to the activated RIS being present, the second set of beams being a subset of the first set of beams that excludes one or more beams of the first set of beams.

30 Claims, 22 Drawing Sheets

BEAM RESTRICTION CONSIDERATIONS IN PRESENCE OF A RECONFIGURABLE INTELLIGENT SURFACE

TECHNICAL FIELD

The technology discussed below relates generally to wireless communication systems, and more particularly, to beam restrictions when a reconfigurable intelligent surface is present.

INTRODUCTION

Wireless communication between devices may be facilitated by various network configurations. In one configuration, a cellular network may enable wireless communication devices (e.g., user equipment (UEs)) to communicate with one another through signaling with a nearby base station or cell. Another wireless communication network configuration is a device to device (D2D) network, in which wireless communication devices may signal one another directly, rather than via an intermediary base station or cell. For example, D2D communication networks may utilize sidelink signaling to facilitate the direct communication between wireless communication devices. In some sidelink network configurations, wireless communication devices may further communicate in a cellular network, generally under the control of a base station. Thus, the wireless communication devices may be configured for uplink and downlink signaling via a base station and further for sidelink signaling directly between the wireless communication devices without transmissions passing through the base station. In wireless communication systems, such as those specified under standards for 5G New Radio (NR), D2D communication between UEs may take place via sidelink communication.

More recently, a reconfigurable intelligent surface (RIS) device with a RIS has been developed to improve wireless communication. For example, the RIS may be able to receive a wireless signal at one particular direction and may reflect the received wireless signal to another particular direction. The RIS device deployed in a wireless communication environment may affect wireless communications near the RIS device, such as a sidelink communication between the UEs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a first device is disclosed. The method includes performing a first transmission using a first set of beams of the first device in response to an activated reconfigurable intelligent surface (RIS) for serving a second device to facilitate communication between the first device and the second device not being present, and performing a second transmission using a second set of beams of the first device in response to the activated RIS being present, the second set of beams being a subset of the first set of beams that excludes one or more beams of the first set of beams.

In another example, a first device for wireless communication is disclosed. The first device includes at least one processor, a transceiver communicatively coupled to the at least one processor, and a memory communicatively coupled to the at least one processor. The at least one processor may be configured to: perform a first transmission using a first set of beams of the first device in response to an activated RIS for serving a second device to facilitate communication between the first device and the second device not being present, and perform a second transmission using a second set of beams of the first device in response to the activated RIS being present, the second set of beams being a subset of the first set of beams that excludes one or more beams of the first set of beams.

In another example, a non-transitory computer-readable storage medium having instructions for first device thereon may be disclosed. The instructions, when executed by a processing circuit, cause the processing circuit to: perform a first transmission using a first set of beams of the first device in response to an activated RIS for serving a second device to facilitate communication between the first device and the second device not being present, and perform a second transmission using a second set of beams of the first device in response to the activated RIS being present, the second set of beams being a subset of the first set of beams that excludes one or more beams of the first set of beams.

In a further example, a first device for wireless communication may be disclosed. The first device may include means for performing a first transmission using a first set of beams of the first device in response to an activated RIS for serving a second device to facilitate communication between the first device and the second device not being present, and means for performing a second transmission using a second set of beams of the first device in response to the activated RIS being present, the second set of beams being a subset of the first set of beams that excludes one or more beams of the first set of beams.

In one example, a method of wireless communication by a first device is disclosed. The method includes receiving a first beam configuration indicating a first set of beams of a second device and a second beam configuration indicating a second set of beams of the second device, the second set of beams being a subset of the first set of beams that excludes one or more beams of the first set of beams, receiving a RIS presence indicator indicating whether an activated RIS serving a second device to facilitate communication between the first device and the second device is present, performing a first beam search on the first set of beams in response to the RIS presence indicator indicating that the activated RIS is not present, and performing a second beam search on the second set of beams in response to the RIS presence indicator indicating that the activated RIS is present.

In another example, a first device for wireless communication is disclosed. The base station includes at least one processor, a transceiver communicatively coupled to the at least one processor, and a memory communicatively coupled to the at least one processor. The at least one processor may be configured to: receive a first beam configuration indicating a first set of beams of a second device and a second beam configuration indicating a second set of beams of the second device, the second set of beams being a subset of the first set of beams that excludes one or more beams of the first set of beams, receive a RIS presence indicator indicating whether an activated RIS serving a second device to facilitate communication between the first device and the second device is present, perform a first beam search on the first set of beams in response to the RIS presence indicator indicating that the activated RIS is not present, and perform a second beam search on the second set of beams in response to the RIS presence indicator indicating that the activated RIS is present.

In another example, a non-transitory computer-readable storage medium having instructions for a first device thereon may be disclosed. The instructions, when executed by a processing circuit, cause the processing circuit to: receive a first beam configuration indicating a first set of beams of a second device and a second beam configuration indicating a second set of beams of the second device, the second set of beams being a subset of the first set of beams that excludes one or more beams of the first set of beams, receive a RIS presence indicator indicating whether an activated RIS serving a second device to facilitate communication between the first device and the second device is present, perform a first beam search on the first set of beams in response to the RIS presence indicator indicating that the activated RIS is not present, and perform a second beam search on the second set of beams in response to the RIS presence indicator indicating that the activated RIS is present.

In a further example, a first device for wireless communication may be disclosed. The first device includes means for receiving a first beam configuration indicating a first set of beams of a second device and a second beam configuration indicating a second set of beams of the second device, the second set of beams being a subset of the first set of beams that excludes one or more beams of the first set of beams, means for receiving a RIS presence indicator indicating whether an activated RIS serving a second device to facilitate communication between the first device and the second device is present, means for performing a first beam search on the first set of beams in response to the RIS presence indicator indicating that the activated RIS is not present, and means for performing a second beam search on the second set of beams in response to the RIS presence indicator indicating that the activated RIS is present.

In one example, a method of wireless communication by a controller of a RIS is disclosed. The method includes receiving, from a first device, an RIS restriction indicator indicating at least one of a beam direction or a zone toward which to restrict use of RIS beamforming of the RIS, the at least one of the beam direction or the zone corresponding to a location of a second device, and restricting use of one or more RIS beams of the RIS toward the at least one of the beam direction or the zone based on the RIS restriction indicator.

In another example, a controller of a RIS for wireless communication is disclosed. The controller includes at least one processor, a transceiver communicatively coupled to the at least one processor, and a memory communicatively coupled to the at least one processor. The at least one processor may be configured to: receive, from a first device, an RIS restriction indicator indicating at least one of a beam direction or a zone toward which to restrict use of RIS beamforming of the RIS, the at least one of the beam direction or the zone corresponding to a location of a second device, and restrict use of one or more RIS beams of the RIS toward the at least one of the beam direction or the zone based on the RIS restriction indicator.

In another example, a non-transitory computer-readable storage medium having instructions for a controller of a RIS thereon may be disclosed. The instructions, when executed by a processing circuit, cause the processing circuit to: receive, from a first device, an RIS restriction indicator indicating at least one of a beam direction or a zone toward which to restrict use of RIS beamforming of the RIS, the at least one of the beam direction or the zone corresponding to a location of a second device, and restrict use of one or more RIS beams of the RIS toward the at least one of the beam direction or the zone based on the RIS restriction indicator.

In a further example, a controller of a RIS device for wireless communication may be disclosed. The controller includes means for receiving, from a first device, an RIS restriction indicator indicating at least one of a beam direction or a zone toward which to restrict use of RIS beamforming of the RIS, the at least one of the beam direction or the zone corresponding to a location of a second device, and means for restricting use of one or more RIS beams of the RIS toward the at least one of the beam direction or the zone based on the RIS restriction indicator.

These and other aspects of the disclosure will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc. of varying sizes, shapes and constitution.

Figure 1:
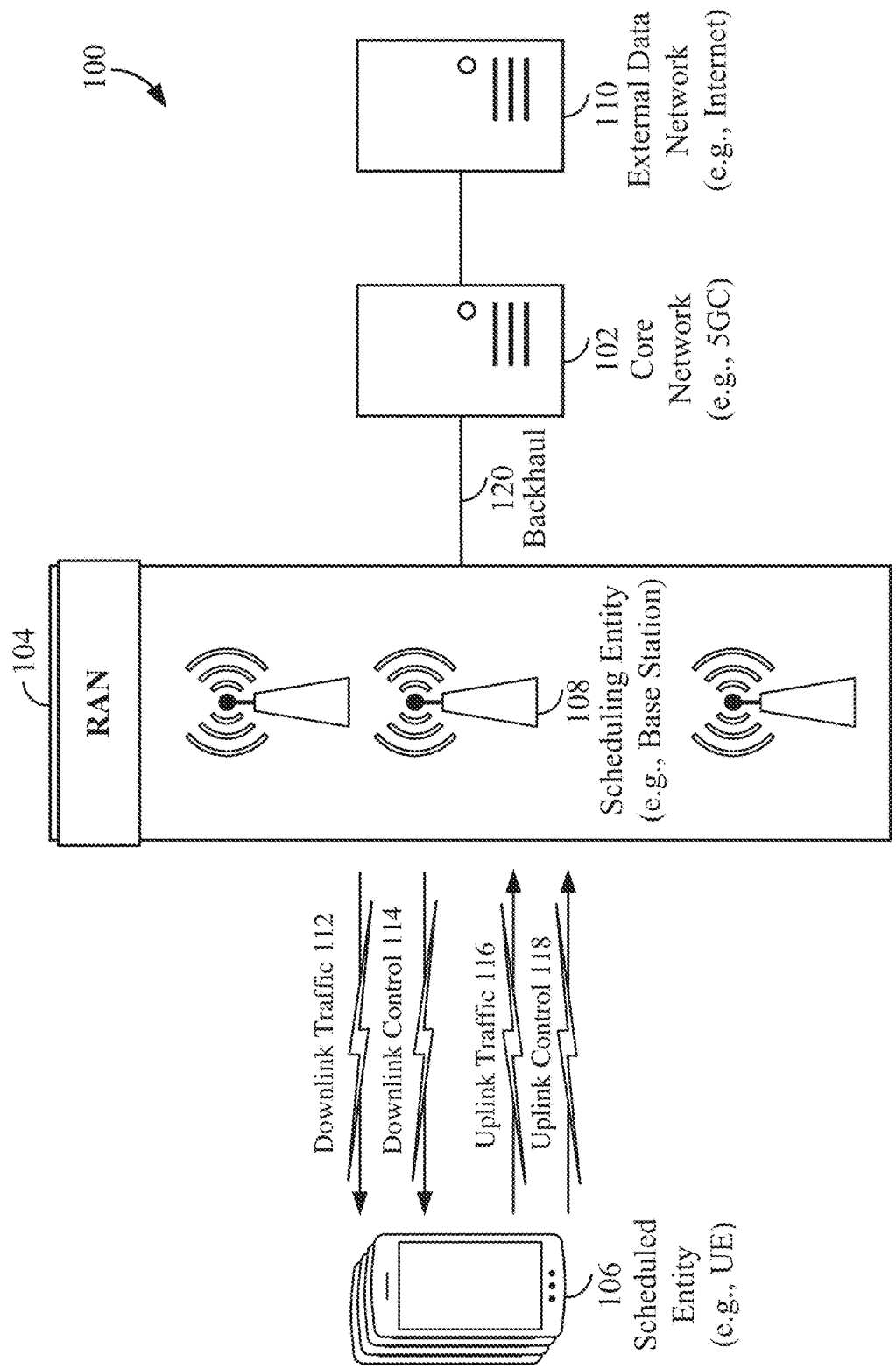
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP) or some other suitable terminology. In some examples, a base station may include two or more TRPs that may be collocated or non-collocated. Each TRP may communicate on the same or different carrier frequency within the same or different frequency band.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
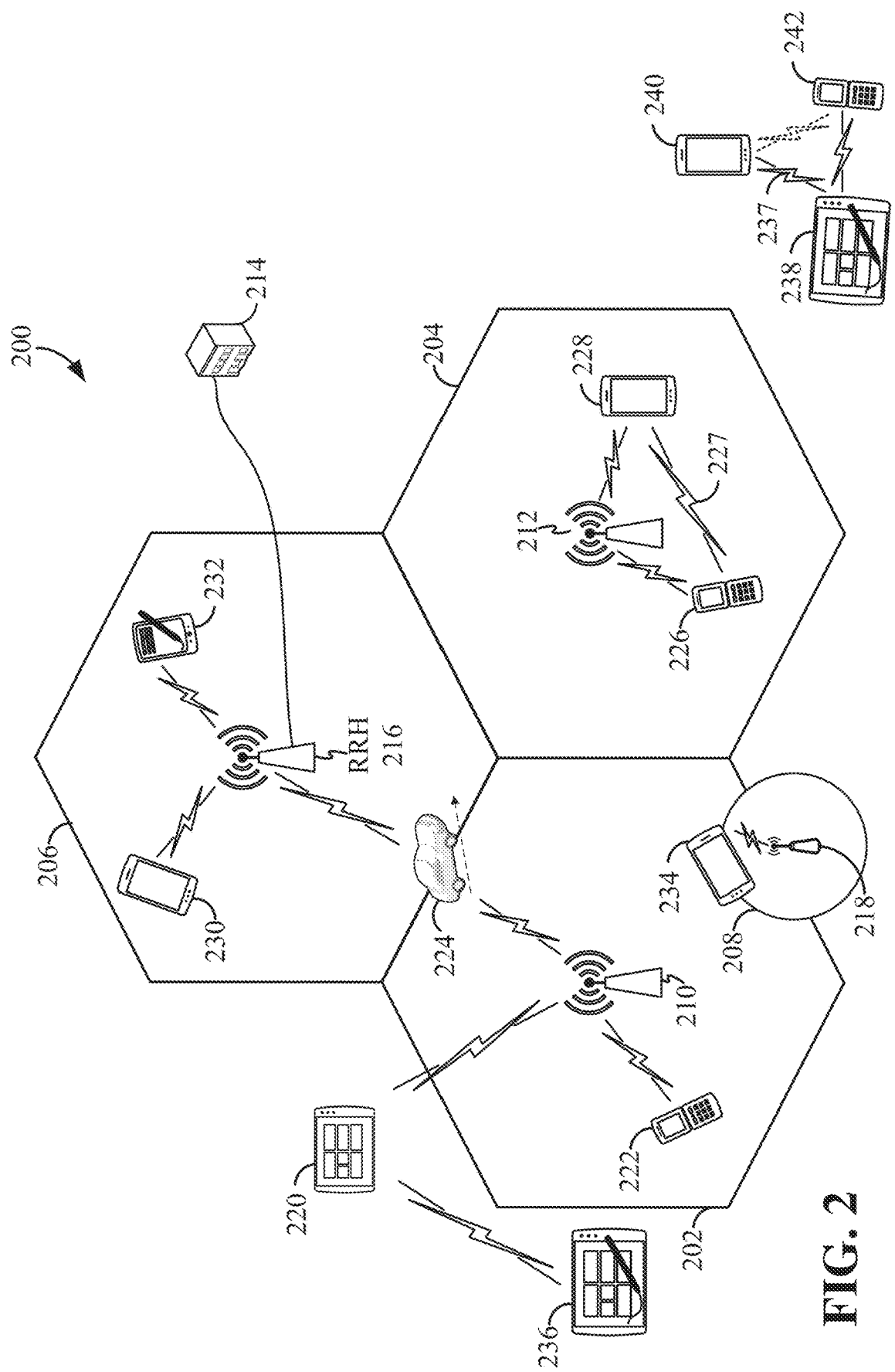
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
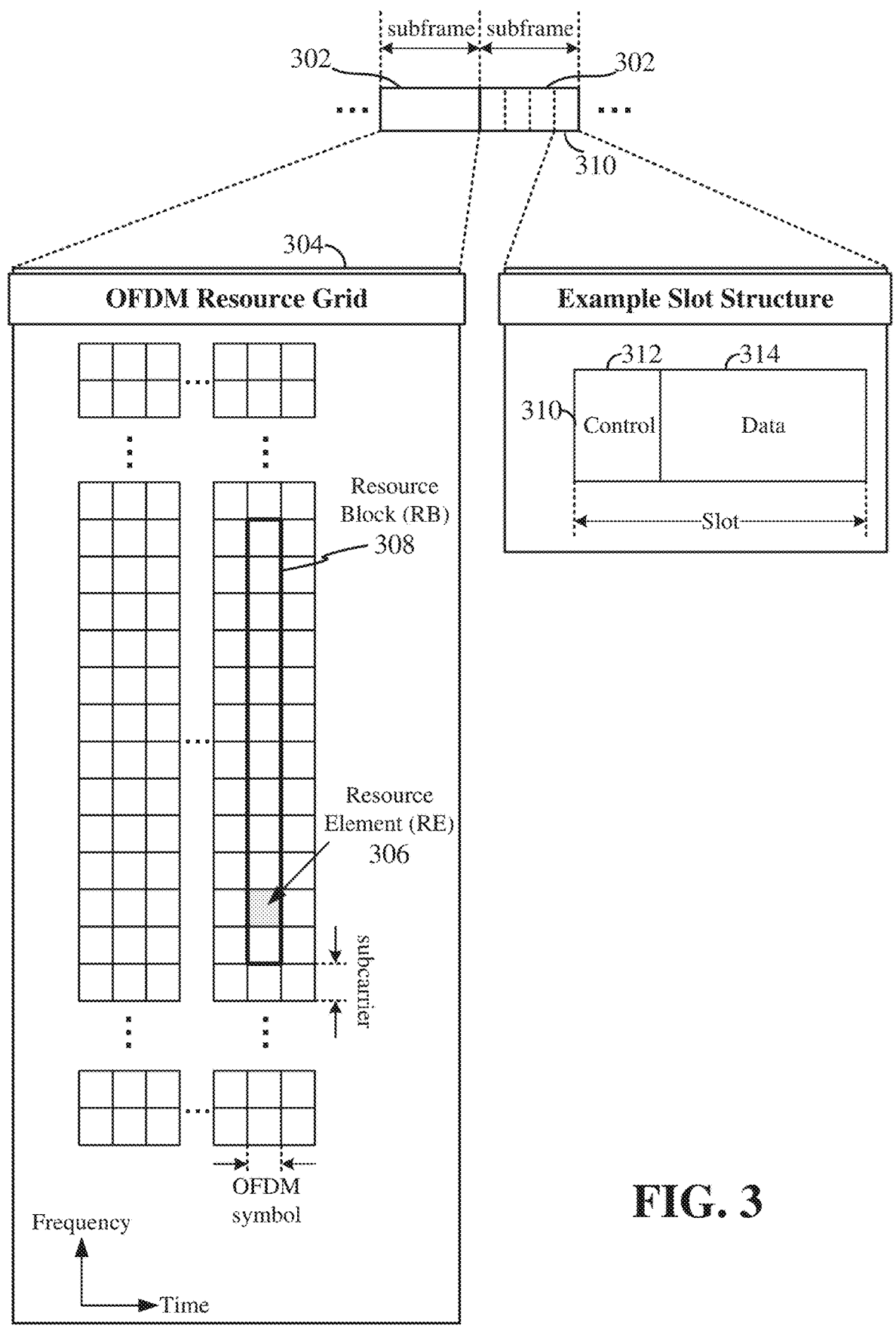
FIG. 3 is a block diagram illustrating a wireless communication system supporting multiple-input multiple-output (MIMO) communication.

Referring now to FIG. 3, an expanded view of an exemplary subframe 302 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
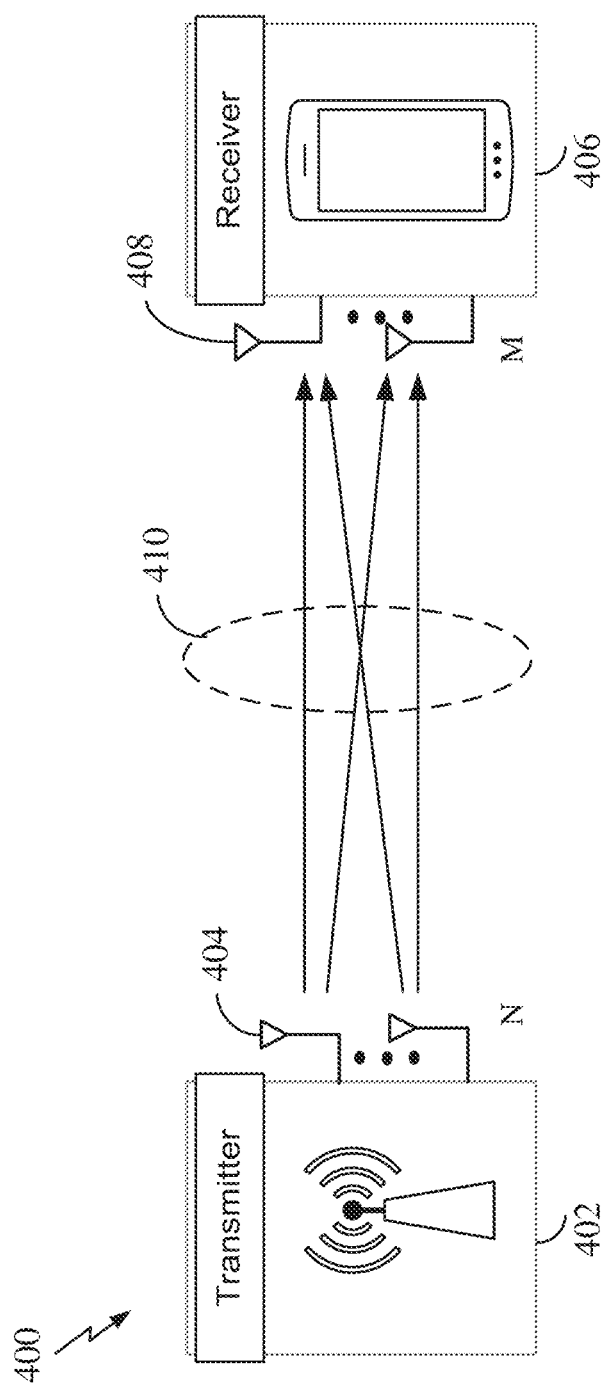
FIG. 4 is a schematic illustration of an organization of wireless resources in an air interface utilizing orthogonal frequency divisional multiplexing (OFDM) according to some embodiments.

In some aspects of the disclosure, the scheduling entity and/or scheduled entity may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the channel quality indicator (CQI) and RI values to the base station for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Figure 5:
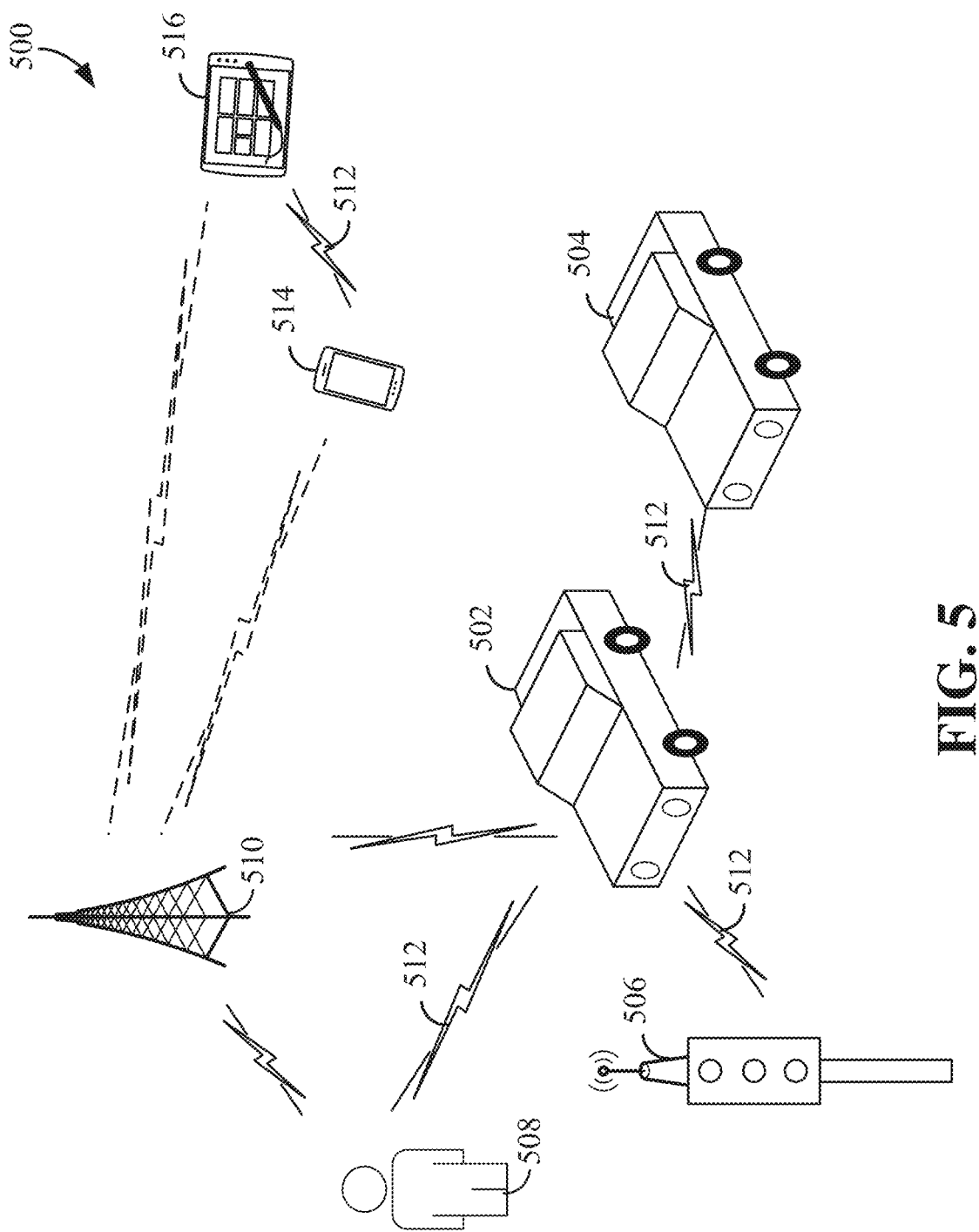
FIG. 5 illustrates an example of a wireless communication network configured to support D2D or sidelink communication.

FIG. 5 illustrates an example of a wireless communication network 500 configured to support D2D or sidelink communication. In some examples, sidelink communication may include V2X communication. V2X communication involves the wireless exchange of information directly between not only vehicles (e.g., vehicles 502 and 504) themselves, but also directly between vehicles 502/504 and infrastructure (e.g., roadside units (RSUs) 506), such as streetlights, buildings, traffic cameras, tollbooths or other stationary objects, vehicles 502/404 and pedestrians 508, and vehicles 502/504 and wireless communication networks (e.g., base station 510). In some examples, V2X communication may be implemented in accordance with the New Radio (NR) cellular V2X standard defined by 3GPP, Release 16, or other suitable standard.

V2X communication enables vehicles 502 and 504 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 502 and 504 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 508 may be utilized to trigger a warning sound, vibration, flashing light, etc., in case of imminent danger.

The sidelink communication between vehicle-UEs (V-UEs) 502 and 504 or between a V-UE 502 or 504 and either an RSU 506 or a pedestrian-UE (P-UE) 508 may occur over a sidelink 512 utilizing a proximity service (ProSe) PC5 interface. In various aspects of the disclosure, the PC5 interface may further be utilized to support D2D sidelink 512 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 5, ProSe communication may further occur between UEs 514 and 516.

ProSe communication may support different operational scenarios, such as in-coverage, out-of-coverage, and partial coverage. Out-of-coverage refers to a scenario in which UEs (e.g., UEs 514 and 516) are outside of the coverage area of a base station (e.g., base station 510), but each are still configured for ProSe communication. Partial coverage refers to a scenario in which some of the UEs (e.g., V-UE 504) are outside of the coverage area of the base station 510, while other UEs (e.g., V-UE 502 and P-UE 508) are in communication with the base station 510. In-coverage refers to a scenario in which UEs (e.g., V-UE 502 and P-UE 508) are in communication with the base station 510 (e.g., gNB) via a Uu (e.g., cellular interface) connection to receive ProSe service authorization and provisioning information to support ProSe operations.

To facilitate D2D sidelink communication between, for example, UEs 514 and 516 over the sidelink 512, the UEs 514 and 516 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 512. For example, the discovery signal may be utilized by the UE 516 to measure the signal strength and channel status of a potential sidelink (e.g., sidelink 512) with another UE (e.g., UE 514). The UE 516 may utilize the measurement results to select a UE (e.g., UE 514) for sidelink communication or relay communication.

In 5G NR sidelink, sidelink communication may utilize transmission or reception resource pools. For example, the minimum resource allocation unit in frequency may be a sub-channel (e.g., which may include, for example, 10, 15, 20, 25, 50, 75, or 100 consecutive resource blocks) and the minimum resource allocation unit in time may be one slot. A radio resource control (RRC) configuration of the resource pools may be either pre-configured (e.g., a factory setting on the UE determined, for example, by sidelink standards or specifications) or configured by a base station (e.g., base station 510).

In addition, there may be two main resource allocation modes of operation for sidelink (e.g., PC5) communications. In a first mode, Mode 1, a base station (e.g., gNB) 510 may allocate resources to sidelink devices (e.g., V2X devices or other sidelink devices) for sidelink communication between the sidelink devices in various manners. For example, the base station 510 may allocate sidelink resources dynamically (e.g., a dynamic grant) to sidelink devices, in response to requests for sidelink resources from the sidelink devices. The base station 510 may further activate preconfigured sidelink grants (e.g., configured grants) for sidelink communication among the sidelink devices. In Mode 1, sidelink feedback may be reported back to the base station 510 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally. SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

Figure 6A:
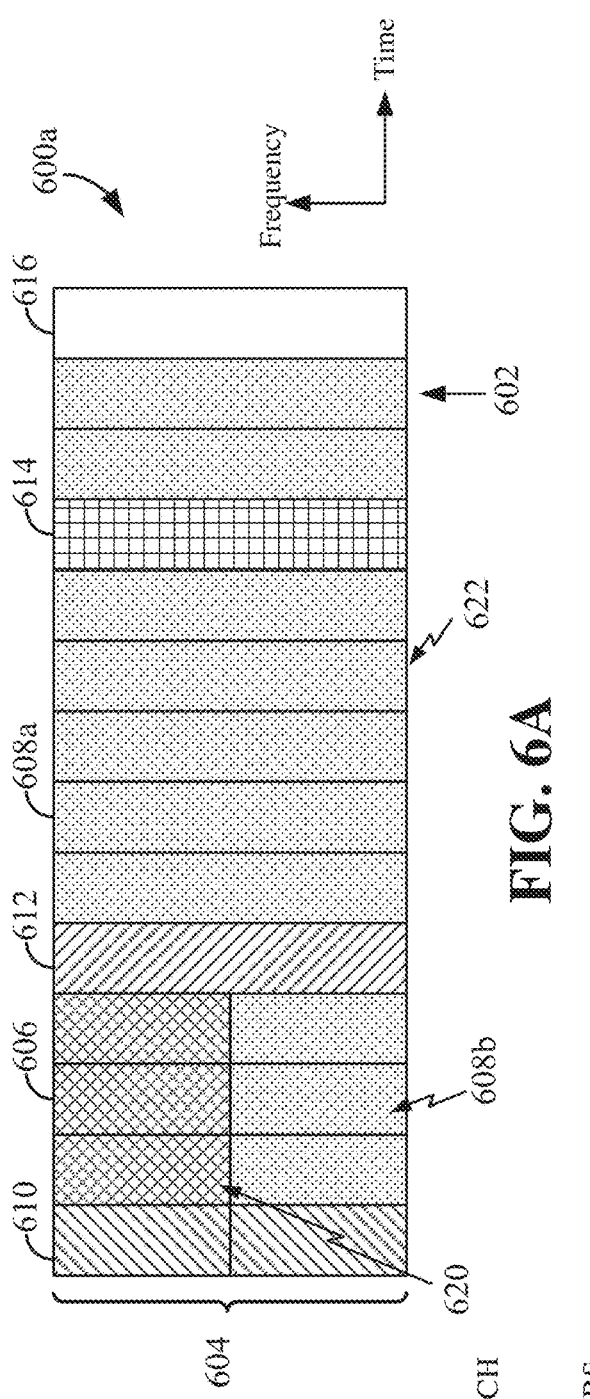
FIGS. 6A and 6B are diagrams illustrating examples of sidelink slot structures according to some aspects.
Figure 6B:
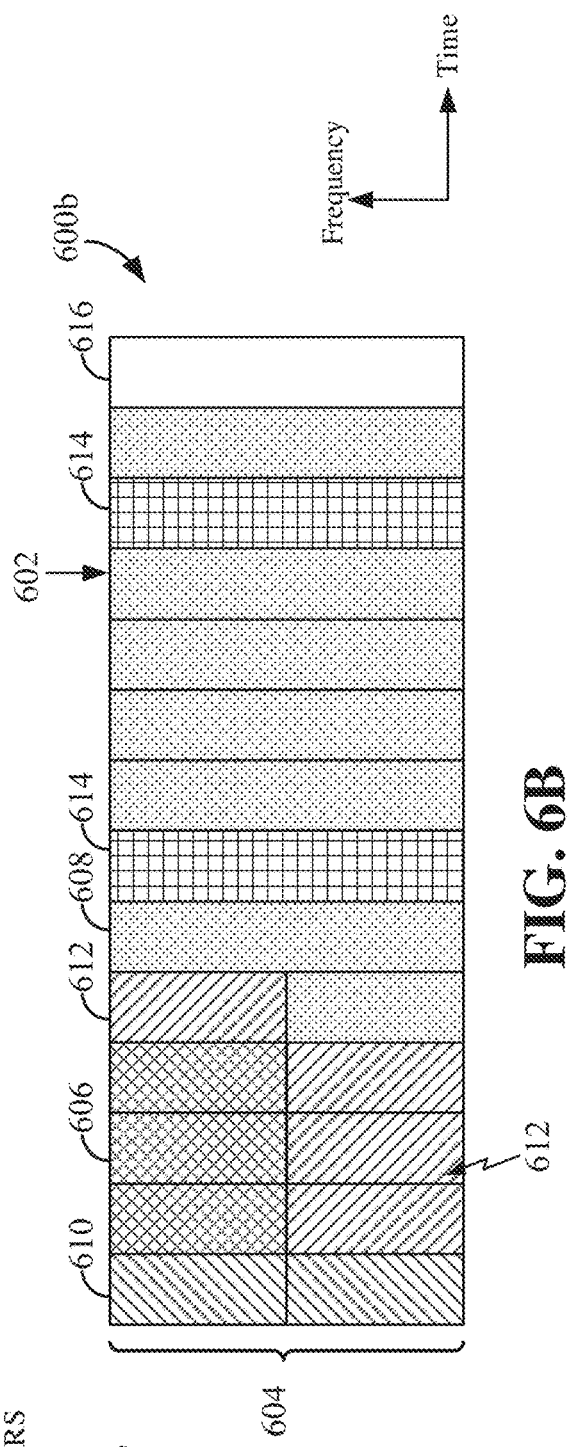

FIGS. 6A and 6B are diagrams illustrating examples of sidelink slot structures according to some aspects. The sidelink slot structures may be utilized, for example, in a V2X or other D2D network implementing sidelink. In the examples shown in FIGS. 6A and 6B, time is in the horizontal direction with units of symbols 602 (e.g., OFDM symbols); and frequency is in the vertical direction. Here, a carrier bandwidth 604 allocated for sidelink wireless communication is illustrated along the frequency axis. The carrier bandwidth 604 may include a plurality of sub-channels, where each sub-channel may include a configurable number of PRBs (e.g., 10, 15, 20, 25, 50, 75, or 100 PRBs).

Each of FIGS. 6A and 6B illustrate an example of a respective slot 600a or 600b including fourteen symbols 602 that may be used for sidelink communication. However, it should be understood that sidelink communication can be configured to occupy fewer than fourteen symbols in a slot 600a or 600b, and the disclosure is not limited to any particular number of symbols 602. Each sidelink slot 600a and 600b includes a physical sidelink control channel (PSCCH) 606 occupying a control region 618 of the slot 600a and 600b and a physical sidelink shared channel (PSSCH) 608 occupying a data region 620 of the slot 600a and 600b. The PSCCH 606 and PSSCH 608 are each transmitted on one or more symbols 602 of the slot 600a. The PSCCH 606 includes, for example, SCI-1 that schedules transmission of data traffic on time-frequency resources of the corresponding PSSCH 608. As shown in FIGS. 6A and 6B, the PSCCH 606 and corresponding PSSCH 608 are transmitted in the same slot 600a and 600b. In other examples, the PSCCH 606 may schedule a PSSCH in a subsequent slot.

In some examples, the PSCCH 606 duration is configured to be two or three symbols. In addition, the PSCCH 606 may be configured to span a configurable number of PRBs, limited to a single sub-channel. The PSCCH resource size may be fixed for a resource pool (e.g., 10% to 100% of one sub-channel in the first two or three symbols). For example, the PSCCH 606 may occupy 10, 12, 15, 20, or 25 RBs of a single sub-channel. A DMRS may further be present in every PSCCH symbol. In some examples, the DMRS may be placed on every fourth RE of the PSCCH 606. A frequency domain orthogonal cover code (FD-OCC) may further be applied to the PSCCH DMRS to reduce the impact of colliding PSCCH transmissions on the sidelink channel. For example, a transmitting UE may randomly select the FD-OCC from a set of pre-defined FD-OCCs. In each of the examples shown in FIGS. 6A and 6B, the starting symbol for the PSCCH 606 is the second symbol of the corresponding slot 600a or 600b and the PSCCH 606 spans three symbols 602.

The PSSCH 608 may be time-division multiplexed (TDMed) with the PSCCH 606 and/or frequency-division multiplexed (FDMed) with the PSCCH 606. In the example shown in FIG. 6A, the PSSCH 608 includes a first portion 608a that is TDMed with the PSCCH 606 and a second portion 608b that is FDMed with the PSCCH 606. In the example shown in FIG. 6B, the PSSCH 608 is TDMed with the PSCCH 606.

One and two layer transmissions of the PSSCH 608 may be supported with various modulation orders (e.g., quadrature phase shift keying (QPSK), 16 quadrature amplitude modulation (16-QAM), 64-QAM and 256-QAM). In addition, the PSSCH 608 may include DMRSs 614 configured in a two, three, or four symbol DMRS pattern. For example, slot 600a shown in FIG. 6A illustrates a two symbol DMRS pattern, while slot 600b shown in FIG. 6B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 608 symbols in the slot 600a or 600b. In addition, a gap symbol 616 is present after the PSSCH 608 in each slot 600a and 600b.

Each slot 600a and 600b further includes SCI-2 612 mapped to contiguous RBs in the PSSCH 608 starting from the first symbol containing a PSSCH DMRS. In the example shown in FIG. 6A, the first symbol containing a PSSCH DMRS is the fifth symbol occurring immediately after the last symbol carrying the PSCCH 606. Therefore, the SCI-2 612 is mapped to RBs within the fifth symbol. In the example shown in FIG. 6B, the first symbol containing a PSSCH DMRS is the second symbol, which also includes the PSCCH 606. In addition, the SCI-2/PSSCH DMRS 612 are shown spanning symbols two through five. As a result, the SCI-2/PSSCH DMRS 612 may be FDMed with the PSCCH 606 in symbols two through four and TDMed with the PSCCH 606 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 606 may be blind decoded at the receiving wireless communication device. However, since the format, starting location, and number of REs of the SCI-2 612 may be derived from the SCI-1, blind decoding of SCI-2 is not needed at the receiver (receiving UE).

In each of FIGS. 6A and 6B, the second symbol of each slot 600*a* and 600*b* is copied onto (repeated on) a first symbol 610 thereof for automatic gain control (AGC) settling. For example, in FIG. 6A, the second symbol containing the PSCCH 606 FDMed with the PSSCH 608*b* may be transmitted on both the first symbol and the second symbol. In the example shown in FIG. 6B, the second symbol containing the PSCCH 606 FDMed with the SCI-2/PSSCH DMRS 612 may be transmitted on both the first symbol and the second symbol.

Figure 7:
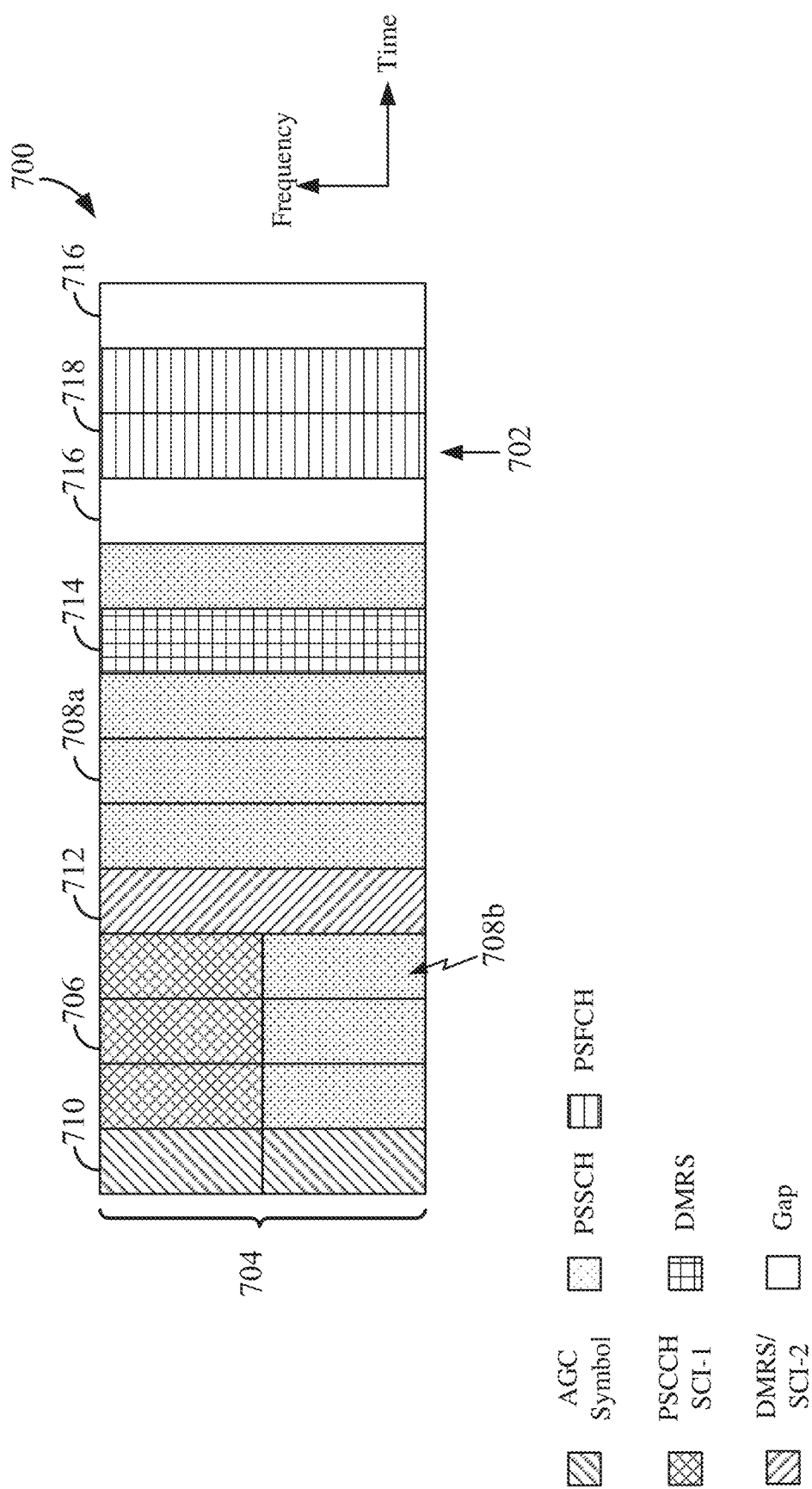
FIG. 7 is a diagram illustrating an example of a sidelink slot structure with feedback resources according to some aspects.

FIG. 7 is a diagram illustrating an example of a sidelink slot structure with feedback resources according to some aspects. The sidelink slot structure may be utilized, for example, in a V2X or other D2D network implementing sidelink. In the example shown in FIG. 7, time is in the horizontal direction with units of symbols 702 (e.g., OFDM symbols); and frequency is in the vertical direction. Here, a carrier bandwidth 704 allocated for sidelink wireless communication is illustrated along the frequency axis. A slot 700 having the slot structure shown in FIG. 7 includes fourteen symbols 702 that may be used for sidelink communication. However, it should be understood that sidelink communication can be configured to occupy fewer than fourteen symbols in a slot 700, and the disclosure is not limited to any particular number of symbols 702.

As in the examples shown in FIGS. 4A and 4B, the sidelink slot 700 includes a PSCCH 706 occupying a control region of the slot 700 and a PSSCH 708 occupying a data region 720 of the slot 700. The PSCCH 706 and PSSCH 708 are each transmitted on one or more symbols 702 of the slot 700*a*. The PSCCH 706 includes, for example, SCI-1 that schedules transmission of data traffic on time-frequency resources of the corresponding PSSCH 708. As shown in FIG. 7, the starting symbol for the PSCCH 706 is the second symbol of the slot 700 and the PSCCH 706 spans three symbols 702. The PSSCH 708 may be time-division multiplexed (TDMed) with the PSCCH 706 and/or frequency-division multiplexed (FDMed) with the PSCCH 706. In the example shown in FIG. 7, the PSSCH 708 includes a first portion 708*a* that is TDMed with the PSCCH 706 and a second portion 708*b* that is FDMed with the PSCCH 706.

The PSSCH 708 may further include a DMRSs 714 configured in a two, three, or four symbol DMRS pattern. For example, slot 700 shown in FIG. 7 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 708 symbols in the slot 700. In addition, a gap symbol 716 is present after the PSSCH 708 in the slot 700.

The slot 700 further includes SCI-2 712 mapped to contiguous RBs in the PSSCH 708 starting from the first symbol containing a PSSCH DMRS. In the example shown in FIG. 7, the first symbol containing a PSSCH DMRS is the fifth symbol occurring immediately after the last symbol carrying the PSCCH 706. Therefore, the SCI-2 712 is mapped to RBs within the fifth symbol.

In addition, as shown in FIG. 7, the second symbol of the slot 700 is copied onto (repeated on) a first symbol 710 thereof for automatic gain control (AGC) settling. For example, in FIG. 7, the second symbol containing the PSCCH 706 FDMed with the PSSCH 708*b* may be transmitted on both the first symbol and the second symbol.

HARQ feedback may further be transmitted on a physical sidelink feedback channel (PSFCH) 718 in a configurable resource period of 0, 1, 2, or 4 slots. In sidelink slots (e.g., slot 700) containing the PSFCH 718, one symbol 702 may be allocated to the PSFCH 718, and the PSFCH 718 may be copied onto (repeated on) a previous symbol for AGC settling. In the example shown in FIG. 7, the PSFCH 718 is transmitted on the thirteenth symbol and copied onto the twelfth symbol in the slot 700*c*. A gap symbol 716 may further be placed after the PSFCH symbols 718.

In some examples, there is a mapping between the PSSCH 708 and the corresponding PSFCH resource. The mapping may be based on, for example, the starting sub-channel of the PSSCH 708, the slot containing the PSSCH 708, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

A reconfigurable intelligent surface (RIS), or reconfigurable intelligent surface, may be used to reflect electromagnetic waves from a transmitter to a receiver. For example, by configuring RIS parameters for the RIS, such as phases, the RIS may be configured to reflect electromagnetic waves communicated in one direction to another direction. Hence, the RIS may be beneficial in that the RIS may increase a wireless communication coverage with little power consumption. In an aspect, another device such as a base station may be configured to communicate with the RIS to configure the RIS, e.g., with certain RIS parameters. The RIS may be a passive device that does not generate any energy or signal by itself. Instead, the RIS may be capable of reflecting an energy or a signal from another device. For example, the RIS may contain active components, but the RIS as a whole may not generate any energy or signal by itself. Further, the RIS may have a cost that is generally lower than traditional distributed antennas systems or repeaters.

The RIS may have a large number of reconfigurable elements, spread out over the RIS, which allows the RIS to be used as phased arrays for beamforming, in order to configure a particular receive direction of a signal and/or a particular transmit direction to reflect the received signal. The reconfigurable elements may be passive elements that are used to redirect/reflect a signal received by the reconfigurable elements and may not be used to actively transmit a signal independently from the signal received by the reconfigurable elements. In one example, a RIS may have 256 reconfigurable elements. The beamforming of the reconfigurable elements of the RIS may be configured differently for different timing. For example, the beamforming of the reconfigurable elements of the RIS may be configured to a first communication pattern to receive a signal in a first direction and to reflect the received signal in a second direction for one period of time, and may be configured to a second communication pattern to receive a signal in a third direction and to reflect the received signal in a fourth direction for another period of time, where the second communication pattern is different from the first communication pattern.

Figure 8:
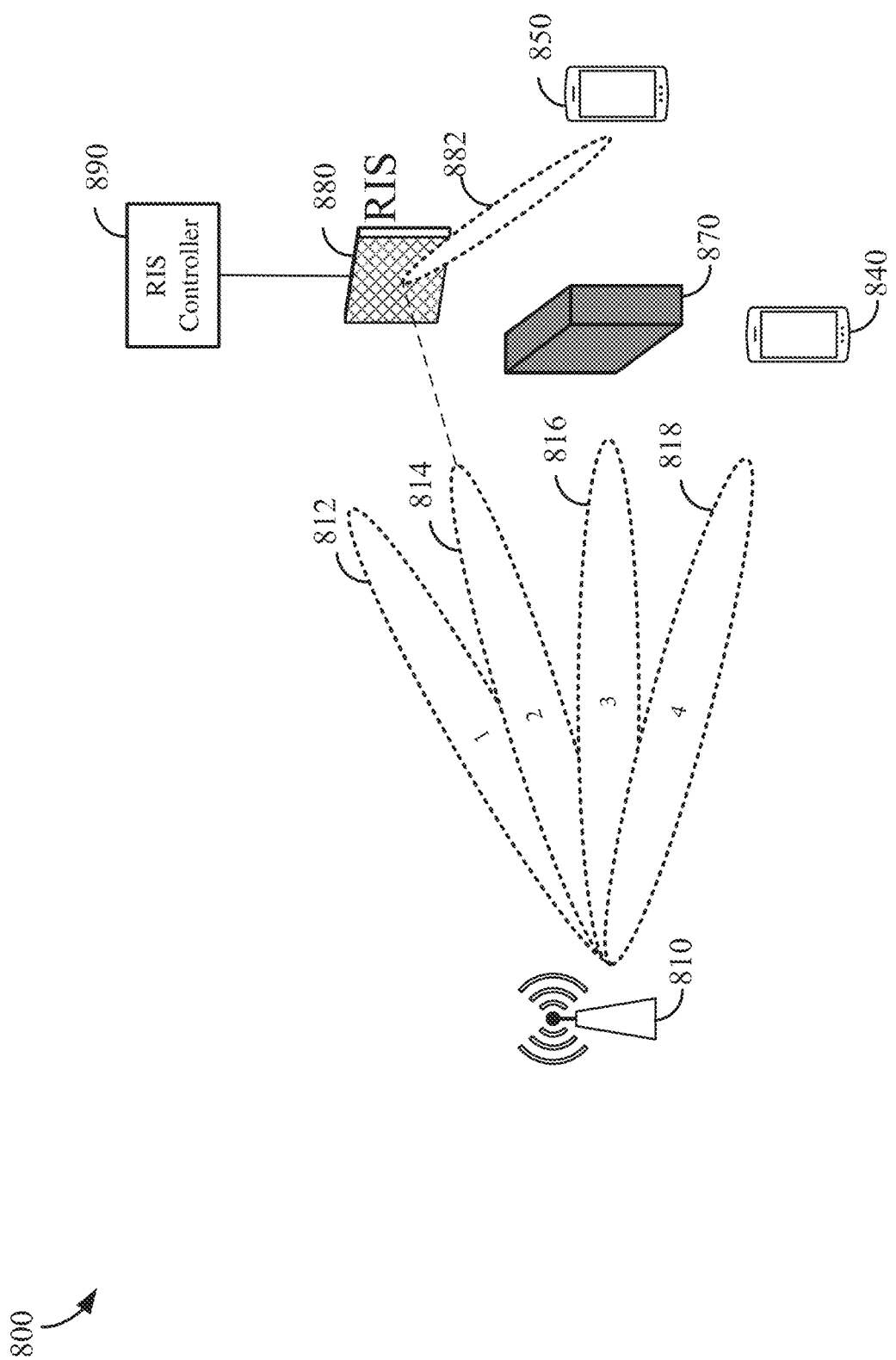
FIG. 8 is an example diagram illustrating a use of a reconfigurable intelligent surface (RIS) device, according to some aspects.

FIG. 8 is an example diagram 800 illustrating an example use of a reconfigurable intelligent surface device, according to some aspects. In FIG. 8, a base station 810 may be configured to utilize four different beams to wirelessly communicate in four different directions, respectively. In particular, the base station 810 may be configured to transmit using a first beam 812, a second beam 814, a third beam 816, and a fourth beam 818, in four different directions, respectively. In FIG. 8, when the base station 810 transmits a signal using the fourth beam 818, a first UE 840 may be able to successfully receive the signal transmitted using the fourth beam 818. On the other hand, a second UE 850 may not be able to successfully receive a signal from the base station 810 without assistance from another device, at least because a signal from the base station 810 is blocked by a blockage 870 (e.g., any type of structure capable of blocking wireless signals). For example, the blockage 870 may completely block wireless signals or may partially block wireless signals.

When a RIS 880 is deployed, the RIS 880 may receive a signal transmitted from the base station 810 using the second beam 814, and reflect the signal in a direction toward the second UE 850, such that the second UE 850 may receive the reflected signal via a beam 882 of the RIS 880. The RIS 880 may be configured by a RIS controller 890. For example, the RIS controller 890 may configure a direction towards which a signal is to be received at the RIS 880 and/or a direction towards which a signal is to be reflected from the RIS 880. The RIS controller 890 in FIG. 8 has a connection to the base station 810, which may be a wired connection and/or a wireless connection. As such, in some aspects, the base station 810 may configure the RIS 880 by communicating particular RIS configurations to the RIS controller 890.

In an aspect, the RIS 880 may be deployed based on a location of the blockage 870. In other words, the RIS 880 may be positioned and/or configured based on the location of the blockage 870 (e.g., positioned and/or configured to facilitate transmission of wireless communication signals around the blockage).

In an aspect, a beam training may be performed using the RIS 880, in order to determine the selected beam of the base station 810 as well as the selected beam of the RIS 880 for the second UE 850. During the beam training, the base station 810 may transmit reference signals (e.g., CSI-RSs) on a plurality of beams of the base station 810 to the RIS 880, and the second UE 850 may determine a signal strength (e.g., an RSRP, an RSRQ, and/or an SNR) of each of the CSI-RSs on each beam of the plurality of beams to select a beam of the base station 810 and/or to select a beam of the RIS 880 that provide the highest signal strength. In FIG. 8, the selected beam of the base station 810 is the second beam 814 and the selected beam of the RIS 880 is the beam 882.

In some aspects, the RIS may be utilized within a sidelink network to facilitate sidelink communication between UEs. The sidelink network may share the same spectrum (e.g., licensed spectrum) as the cellular network. For example, a first UE and a second UE may perform sidelink communication with each other during a time period when a base station is not transmitting a downlink communication to the first UE and the second UE. In addition, the first UE and the second UE may not perform sidelink communication during another time period when the base station is transmitting a downlink communication to the first UE and/or the second UE. Further, if a third UE is located sufficiently far from the first UE and the second UE, the first UE and the second UE may transmit sidelink communication to each other even when the third UE is communicating with the base station.

As discussed above, in Mode 1, the base station may control the resource allocation for a sidelink communication. On the other hand, in Mode 2, a UE may determine resource allocation for a sidelink communication by sensing signals and reserving available resources for the sidelink communication based on the sensing. The UE may utilize resources that are not reserved by another device and/or resources that are reserved by another device and that are sufficiently far away from the UE so as to not cause a signal interference with the UE. For example, in Mode 2, the UE may determine available resources based on sensing of UE activities around the UE. In an example, in Mode 2, the UE may determine available resources by measuring the signal strength (e.g., reference signal received power) in frequency resources, and may avoid using frequency resources having a signal strength exceeding a signal strength threshold, thus indicating that those frequency resources are occupied and therefore not available. The UE may further determine that a frequency resource having a signal strength not exceeding the signal strength threshold is available for the sidelink communication, and thus the UE may reserve this frequency resource for the sidelink communication.

A first device may be a wireless device capable of wirelessly communicating with another wireless device such as a second device, either directly or via a RIS such as the RIS. For example, the first device may transmit a signal, and the RIS may receive the signal and reflect the received signal toward the second device. In an example, the first device may be a base station or a UE, and the second device may be a UE. When the first device is communicating with the second device via a first RIS, there may be a third device and/or a second RIS. Such a presence of different wireless devices other than the first device, the second device, and the first RIS may cause interference in communication between the first device and the second device via the first RIS. For example, when a base station is serving a first UE via a first RIS reflecting transmissions from the base station to the UE, a presence of a second UE and/or a second RIS may cause interference in the communication between the base station and the first UE via the first RIS.

Figure 9:
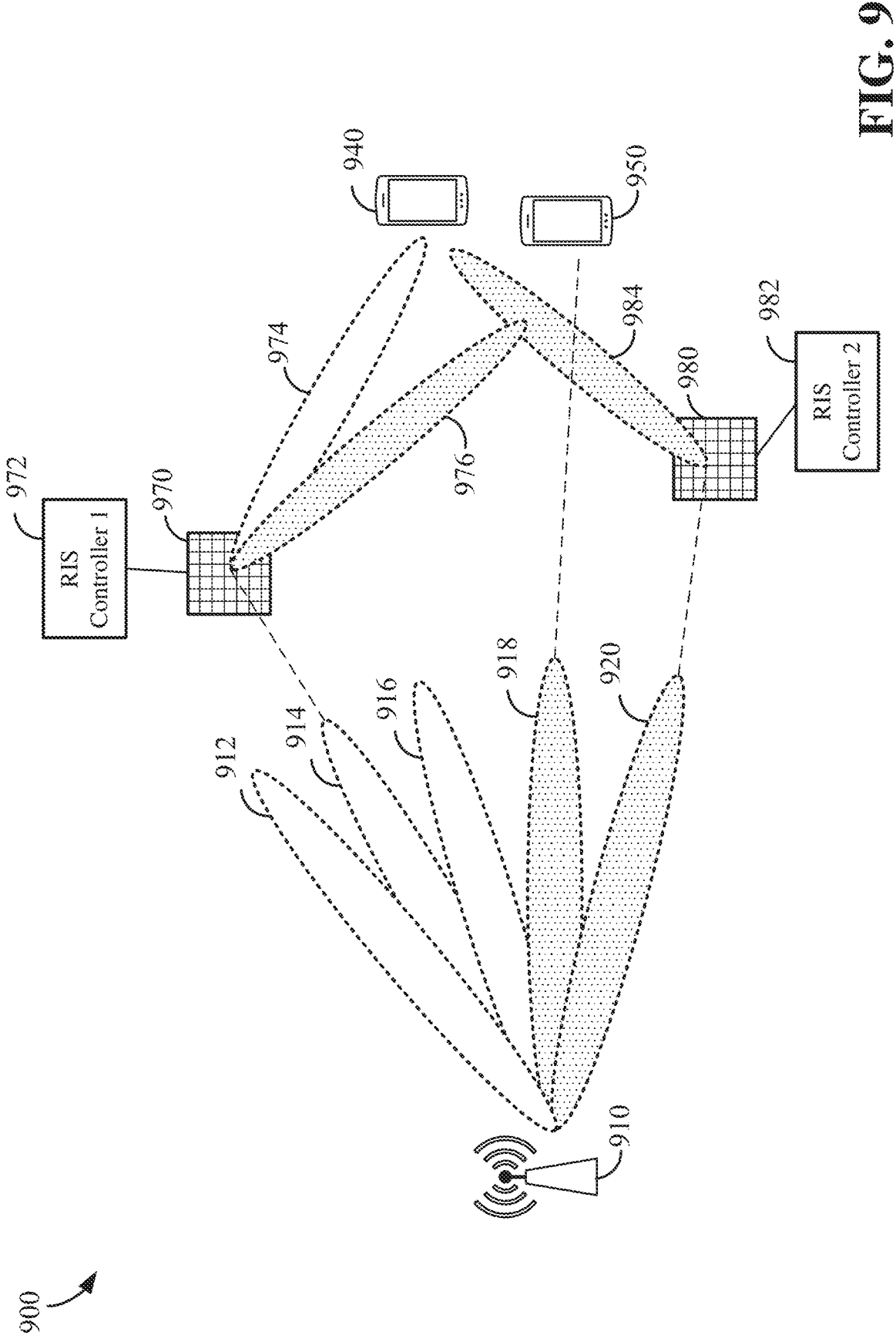
FIG. 9 is an example diagram illustrating various beams that may cause interference in a communication between a base station and a UE, according to some aspects.

FIG. 9 is an example diagram 900 illustrating various beams that may cause interference in a communication between a base station and a UE, according to some aspects. In FIG. 9, a base station 910 may be configured to utilize five different beams to wirelessly communicate in multiple different directions, respectively. In particular, the base station 910 may be configured to transmit using a first beam 912, a second beam 914, a third beam 916, a fourth beam 918, and a fifth beam 920, in five different directions, respectively.

A first RIS 970 and a second RIS 980 may be deployed to assist communication between the base station 910 and UEs, and may be configured by a first RIS controller 972 and a second RIS controller 982, respectively. In FIG. 9, the first RIS 970 may be a serving RIS that serves a first UE 940 to facilitate communication between the base station 910 and the first UE 940. Hence, the first RIS 970 may receive a signal from the base station 910 and reflect the signal in a direction toward the first UE 940. For example, the first RIS 970 may receive a signal transmitted using the second beam 914 of the base station 910, and reflect the signal using a first beam 974 of the first RIS 970 toward the first UE 940. The second RIS 980 may not serve the first UE 940 for the communication between the base station 910 and the first UE 940.

In an aspect, the first RIS 970 may be capable of reflecting the signal in different directions other than the direction toward the first UE 940. For example, as shown in FIG. 9, the first RIS 970 may reflect the signal in a direction toward a second UE 950 by using a second beam 976 of the first RIS 970. However, if the first RIS 970 serving the first UE 940 utilizes a beam of the first RIS 970 towards a different UE not served by the first RIS 970, the first UE 940 may experience interference due to the utilization of such a beam. Hence, in FIG. 9, the first UE 940 may experience interference if the first RIS 970 serving the first UE 940 utilizes the second beam 976 in the direction of the second UE 950 not served by the first RIS 970.

Further, if the second RIS 980 not serving the first UE 940 utilizes a beam of the second RIS 980 toward the first UE 940, the first UE 940 may experience interference due to the utilization of the beam of the second RIS 980. In FIG. 9, the second RIS 980 utilizes a beam 984 of the second RIS 980 in a direction toward the first UE 940, which causes interference experienced by the first UE 940. The fifth beam 920 of the base station 910 may be also be considered as a beam causing interference experienced by the first UE 940 because the utilization of the beam 984 of the second RIS 980 in FIG. 9 is for reflecting a signal from the base station 910 transmitted using the fifth beam 920 of the base station 910.

In addition, if the base station 910 in communication with the first UE 940 utilizes a beam of the base station 910 in a direction toward a second UE different from the first UE 940, the second UE may experience interference caused by utilization of such a beam of the base station 910. In FIG. 9, the fourth beam 918 of the base station 910 is in a direction toward the second UE 950, and thus utilization of the fourth beam 918 to communicate with the second UE 950 may cause interference experienced by the second UE 950.

As discussed above, there may be different types interference cases, where the different types of interference cases may occur separately or simultaneously. In a first interference case, when a first device is in communication with a second device via a RIS serving the second device to facilitate communication between the first device and the second device, utilizing a beam of the first device in a direction toward a third device may cause interference on the third device. In the first interference case, in some situations, the interference caused by the beam of the base station in the direction toward the third device may occur when an activated RIS is present, but may not occur when the activated RIS is not present.

The first device may restrict the use of the beam (of the first device) causing interference on the third device, e.g., by refraining from utilizing such a beam. However, in some situations, if the serving RIS is not activated (e.g., by being turned off or in a sleep mode) and thus does not reflect any signals or if the serving RIS is removed, the beam that may cause interference on the third device in the presence of the activated serving RIS may be no longer cause interference on the third device. Hence, restricting the use of such a beam may not be desirable when the activated serving RIS is not present.

Hence, according to some aspects of the disclosure, two different sets of beams of the first device may be configured, such that different sets of beams may be used depending on whether an activated RIS for serving a second device to facilitate communication between the first device and the second device is present or not. In particular, the first device may perform a first transmission using a first set of beams of the first device when the activated RIS for serving the second device to facilitate communication between the first device and the second device is not present. On the other hand, the first device may perform a second transmission using a second set of beams of the first device when the activated RIS for serving the second device is present. The second set of beams may be a subset of the first set of beams that excludes one or more beams of the first set of beams of the first device. In an aspect, the activated RIS is not present when no RIS serving the second device is present or when no RIS serving the second device is activated. In an aspect, the one or more excluded beams may be in one or more directions toward one or more third devices and thus may cause interference at the one or more third devices.

In an aspect, the first device may determine the one or more beams of the first set of beams to be excluded from the second set of beams based on at least one of a location of the second device or a history of communications between the first device and the second device, where the one or more beams are in one or more directions toward the second device. For example, in some aspects, beams of the first device that are pointing toward the second device may be excluded from the second set. In an aspect, the history of communications includes at least one of a history of transmissions of data signals or a history of transmissions of a set of reference signals from the first device during a beam training to determine at least one beam of the first device corresponding to at least one reference signal with a highest signal strength observed by second device within the set of reference signals. For example, the history of communications may show which beam(s) of the first device in the past provided highest signal strength(s) for communication with the second device (e.g., via the RIS).

In an aspect, the first device may transmit, and the second device may receive, a first beam configuration indicating the first set of beams and a second beam configuration indicating the second set of beams, as well as a RIS presence indicator indicating whether the activated RIS is present. In an aspect, the first beam configuration and the second beam configuration are transmitted via at least one of an RRC message, a MAC-CE, or control information (e.g. DCI). In an aspect, the RIS presence indicator is transmitted via at least one of an RRC message, a MAC-CE, or control information (e.g., DCI). If the first device is a base station and the second device is a UE, at least one of a Uu-RRC, a Uu-MAC-CE, or DCI may be used to transmit the first and second beam configurations and/or the RIS presence indicator. If the first device and the second device are in sidelink communication, at least one of a PC5-RRC, a PC5-MAC-CE, a SCI, or a dedicated PSSCH may be used to transmit the first and second beam configurations and/or the RIS presence indicator.

When the second device receives the first beam configuration and the second beam configuration, the second device may determine the first set of beams of the first device and the second set of beams of the first device, to perform a beam search. If the RIS presence indicator indicates that the activated RIS is not present, the second device may perform a first beam search on the first set of beams. Hence, if the RIS presence indicator indicates that the activated RIS is not present, the second device may communicate with the first device based on the first beam search. If the RIS presence indicator indicates that the activated RIS is present, the second device may perform a second beam search on the second set of beams. Hence, if the RIS presence indicator indicates that the activated RIS is present, the second device may communicate with the second device based on the second beam search.

In an aspect, the first device may determine the one or more beams of the first set of beams to be excluded from the second set of beams based on a location of the third device and/or based on a history of communications between the first device and the third device, where the one or more excluded beams are in one or more directions toward the third device. In an aspect, the history of communications may include at least one of a history of transmissions of data signals or a history of transmissions of a set of reference signals (e.g., CSI-RS) from the first device during a beam training to determine at least one beam of the first device corresponding to at least one reference signal with a highest signal strength observed by the third device within the set of reference signals, where the beam training includes reporting, by the third device, the at least one beam with the highest signal strength to the first device.

In some aspects, the first device may be a base station and the second device may be a UE. In another aspect, the first device may be a first UE and the second device may be second UE, and thus the communication between the first device and the second device may be a sidelink communication. In this aspect, the first UE may be a primary UE, a relay UE, or a controlling UE or a RIS-served UE capable of reserving a RIS for a particular duration.

Figure 10:
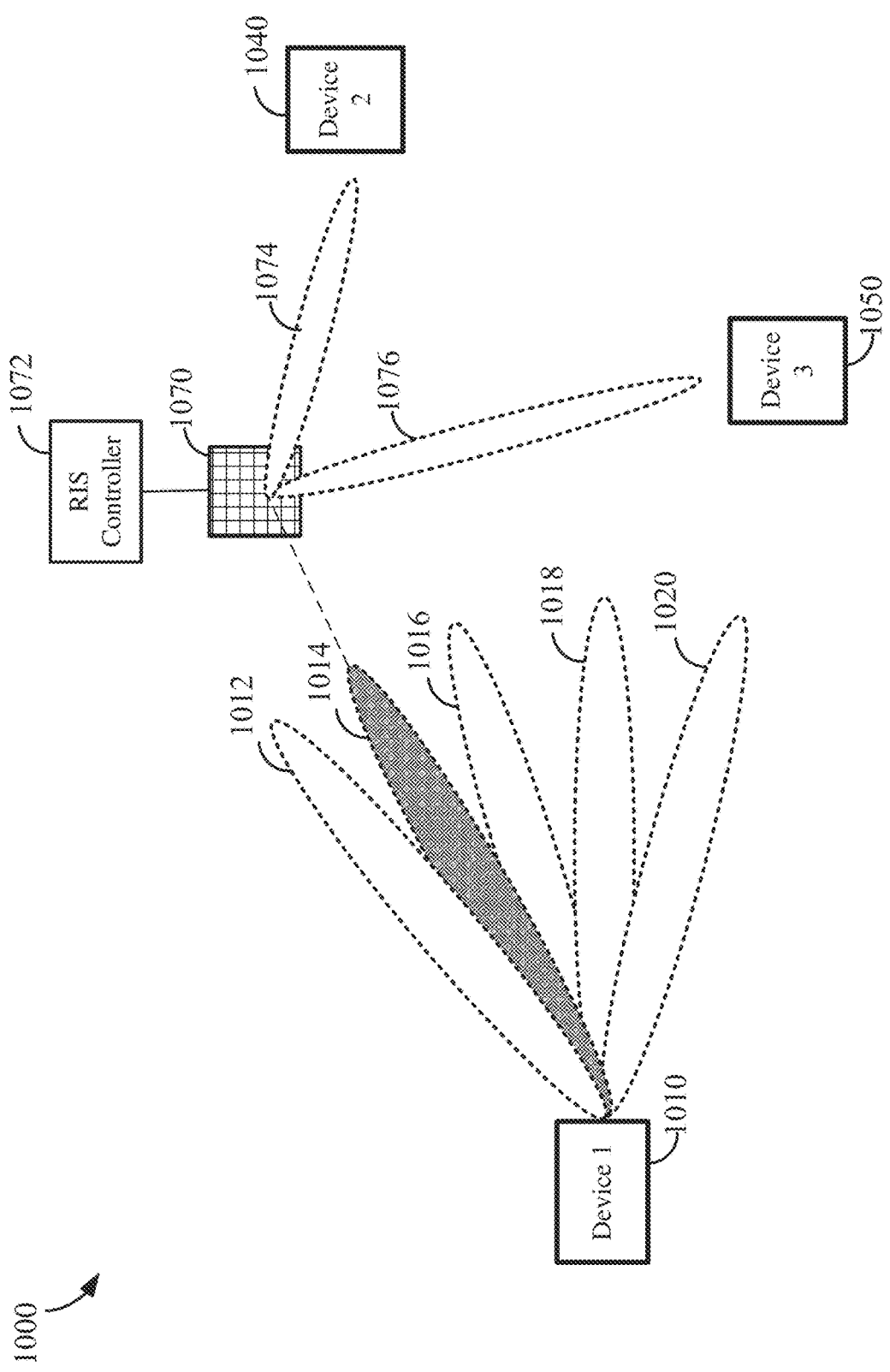
FIG. 10 is an example diagram illustrating the first interreference case when a first device is in communication with a second device via a reconfigurable intelligent surface (RIS) serving the second device, according to some aspects.

FIG. 10 is an example diagram 1000 illustrating the first interreference case when a first device is in communication with a second device via a RIS serving the second device, according to some aspects. In FIG. 10, a first device 1010 may be configured to utilize five different beams to wirelessly communicate in multiple different directions, respectively. In particular, the first device 1010 may be configured to transmit using a first beam 1012, a second beam 1014, a third beam 1016, a fourth beam 1018, and a fifth beam 1020, in five different directions, respectively. In some cases, the first device 1010 may be a base station.

A RIS 1070 may be deployed to facilitate communication between the first device 1010 and the second device 1040, and may be configured by a RIS controller 1072. In FIG. 10, the RIS 1070 may be a serving RIS that serves the second device 1040 to facilitate communication between the first device 1010 and the second device 1040. Hence, the RIS 1070 may receive a signal from the first device 1010 and reflect the signal in a direction toward the second device 1040. For example, the RIS 1070 may receive a signal transmitted using the second beam 1014 of the first device 1010, and reflect the signal using a first beam 1074 of the RIS 1070 toward the second device 1040.

However, if the RIS 1070 also utilizes a second beam 1076 of the RIS 1070, then the RIS 1070 may reflect the signal transmitted from the first device 1010 toward a third device 1050. Such utilizations of the second beam 1014 of the first device 1010 and the second beam 1076 of the RIS 1070 may cause interference at the third device 1050. Hence, the first device 1010 may restrict the utilization of the second beam 1014 of the first device 1010 when the RIS 1070 is activated. In particular, the first device 1010 may configure a first set of beams including the first beam 1012, the second beam 1014, the third beam 1016, the fourth beam 1018, and the fifth beam 102, and may also configure a second set of beams including the first beam 1012, the third beam 1016, the fourth beam 1018, and the fifth beam 102 but excluding the second beam 1014. When the RIS 1070 is not activated or is not present, the first device 1010 may perform a first transmission using the first set of beams. When the RIS 1070 is activated, the first device 1010 may perform a second transmission using the second set of beams excluding the second beam 1014, in order to reduce interference on the third device 1050.

When the activated RIS is not present, the interference on the third device may not exist, and thus the first device may perform the transmission using the one or more excluded beams. Hence, in an aspect, the first device may refrain from using the one or more excluded beams during one or more first time periods different from the one or more second time periods, where the one or more first time periods may be the time periods during which the activated RIS is present. On the other hand, the first device may perform a transmission using the one or more excluded beams during one or more second time periods, where the one or more second time periods may be the time periods during which the activated RIS is not present. Referring to FIG. 10, for example, if the RIS 1070 is not activated or is removed, then the second beam 1014 of the first device 1010 will no longer cause the interference on the third device 1050 via the second beam 1076 of the RIS 1070. For the first time periods during which the RIS 1070 is activated or is present, the first device 1010 may not perform a transmission using the second beam 1014 to avoid the interference on the third device 1050. On the other hand, for the second time periods during which the RIS 1070 is not activated or is not present, the first device 1010 may perform a transmission using the second beam 1014. In an example, the first time periods may include multiple periodic off-durations to periodically refrain from using the one or more excluded beam. In this example, the second time periods may include multiple periodic on-durations to periodically use the first beam.

In some cases, an activated RIS may cause interference in communication with one or more devices. In particular, in an second interference case, when a first device is communicating with a second device and a serving RIS is activated to facilitate the communication between the first device and the second device, other devices that are not served by the serving RIS for communication with the base station may experience interference caused by the serving RIS. Hence, beam(s) of the serving RIS may be restricted to reduce the interference caused by the serving RIS on the other devices not served by the serving RIS. In a third interference case, when a first device is communicating with a second device and a first serving RIS is activated to facilitate the communication between the first device and the second device, a second RIS that is activated and is not serving the second device may cause interference in the communication between the first device and the second device. Hence, beam(s) of the second RIS not serving the second device may be restricted to reduce the interference caused by the second RIS on the second device served by the first RIS.

Hence, according to some aspects of the disclosure, the first device may identify a location of a third device, and transmit, to a controller of a second RIS, an RIS restriction indicator indicating at least one of a RIS beam direction or a zone toward which to restrict use of RIS beamforming of the second RIS, where the at least one of the RIS beam direction or the zone corresponds to the location of the second device. In an example, the zone may be indicated by a corresponding zone identifier. When the controller receives the RIS restriction indicator, the controller may restrict use of one or more RIS beams toward the at least one of the beam direction or the zone based on the RIS restriction indicator.

In an aspect, the RIS restriction indicator indicates one or more first time periods for the RIS to refrain from utilizing one or more RIS beams of the second RIS toward the at least one of the beam direction or the zone. In this aspect, the RIS restriction indicator further indicates one or more second time periods for the second RIS to utilize the one or more RIS beams toward the at least one of the beam direction or the zone. In an aspect, the one or more first time periods include a plurality of periodic off-duration to periodically refrain from utilizing the one or more RIS beams toward the at least one of the beam direction or the zone.

In some aspects, in the second interference case, the second RIS may be the RIS serving the second device to facilitate communication between the first device and the second device. In this aspect, the first device may identify that the third device is not served by the RIS to facilitate communication between the first device and the third device. Hence, in the second interference case, the RIS restriction indicator may be transmitted to the controller of the RIS serving the second device and not serving the third device, such that the use of the one or more beams of the RIS not serving the third device may be restricted based on the RIS restriction indicator.

In some aspects, in the third interference case, the third device may be the second device. In this aspect, the second RIS is different from the RIS and the first device may identify that the second RIS does not serve the third device to facilitate communication between the first device and the third device. In an aspect, the first device may further identify that the RIS serves the second device to facilitate communication between the first device and the second device. Hence, in the third interference case, the first device may transmit the RIS restriction indicator to the controller of the second RIS not serving the second device, such that the use of the one or more beams of the second RIS not serving the second device may be restricted based on the RIS restriction indicator.

Figure 11:
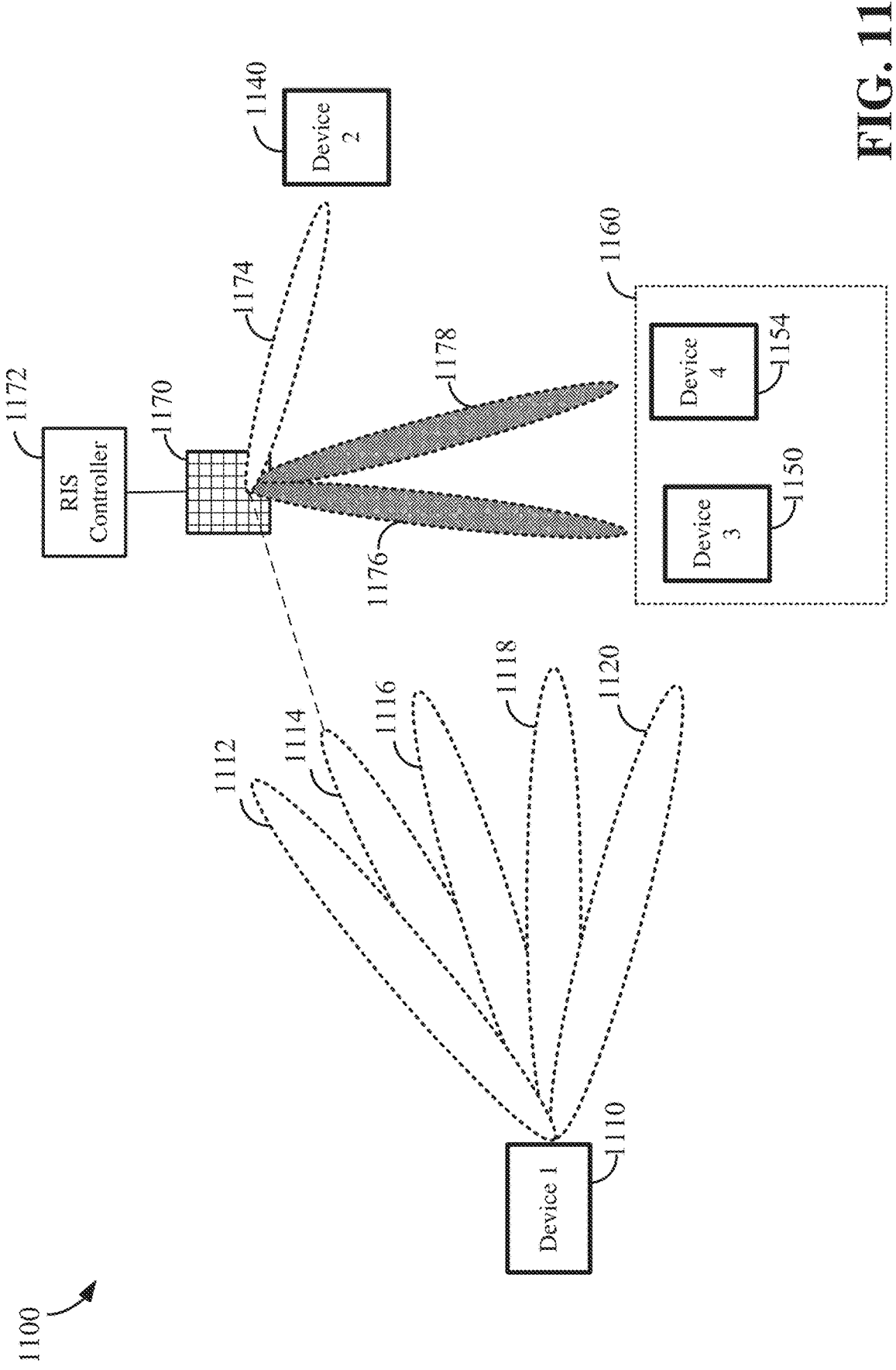
FIG. 11 is an example diagram illustrating the second interreference case when a first device is in communication with a second device via a RIS serving the second device, with other devices not served by the RIS, according to some aspects.

FIG. 11 is an example diagram 1100 illustrating the second interreference case when a first device is in communication with a second device via a RIS serving the second device, with other devices not served by the RIS, according to some aspects. In FIG. 11, a first device 1110 may be configured to utilize five different beams to wirelessly communicate in multiple different directions, respectively. In particular, the first device 1110 may be configured to transmit using a first beam 1112, a second beam 1114, a third beam 1116, a fourth beam 1118, and a fifth beam 1120, in five different directions, respectively. In some cases, the first device 1110 may be a base station.

A RIS 1170 may be deployed to facilitate communication between the first device 1110 and the second device 1140, and may be configured by a RIS controller 1172. In FIG. 11, the RIS 1170 may be a serving RIS that serves the second device 1140 to facilitate communication between the first device 1110 and the second device 1140. Hence, the RIS 1170 may receive a signal from the first device 1110 and reflect the signal in a direction toward the second device 1140. For example, the RIS 1170 may receive a signal transmitted using the second beam 1114 of the first device 1110, and reflect the signal using a first beam 1174 of the RIS 1170 toward the second device 1140.

However, if the RIS 1170 also utilizes a second beam 1176 and a third beam 1178 of the RIS 1170, then the RIS 1170 may reflect the signal transmitted from the first device 1110 toward a third device 1150 and a fourth device 1154, respectively. The first device 1110 may identify that the third device 1150 is not served by the RIS 1170 for communication between the first device 1110 and the third device 1150 and the fourth device 1154 is not served by the RIS 1170 for communication between the first device 1110 and the fourth device 1154. Hence, such utilizations of the second beam 1176 and the third beam 1178 of the RIS 1170 not serving the third device 1150 and the fourth device 1154 may cause interferences at the third device 1150 and the fourth device 1154, respectively. Hence, when the first device 1110 identifies that the third device 1150 and the fourth device 1154 are not served by the RIS 1170, the first device 1110 may transmit, to the RIS controller 1172, a RIS restriction indicator indicating RIS beam directions and/or a zone 1160 toward which to restrict use of RIS beamforming of the second RIS, where the directions and/or the zone corresponds to the locations of the third device 1150 and the fourth device 1154. When the RIS controller 1172 receives the RIS restriction indicator, the RIS controller may restrict use of the second beam 1176 and the third beam 1178 of the RIS 1170 toward the directions and/or the zone 1160 corresponding to the locations of the third device 1150 and the fourth device 1154. By restricting the use of the second beam 1176 and the third beam 1178 of the RIS 1170 toward the locations of the third device 1150 and the fourth device 1154, the interferences at the third device 1150 and the fourth device 1154 may be reduced.

Figure 12:
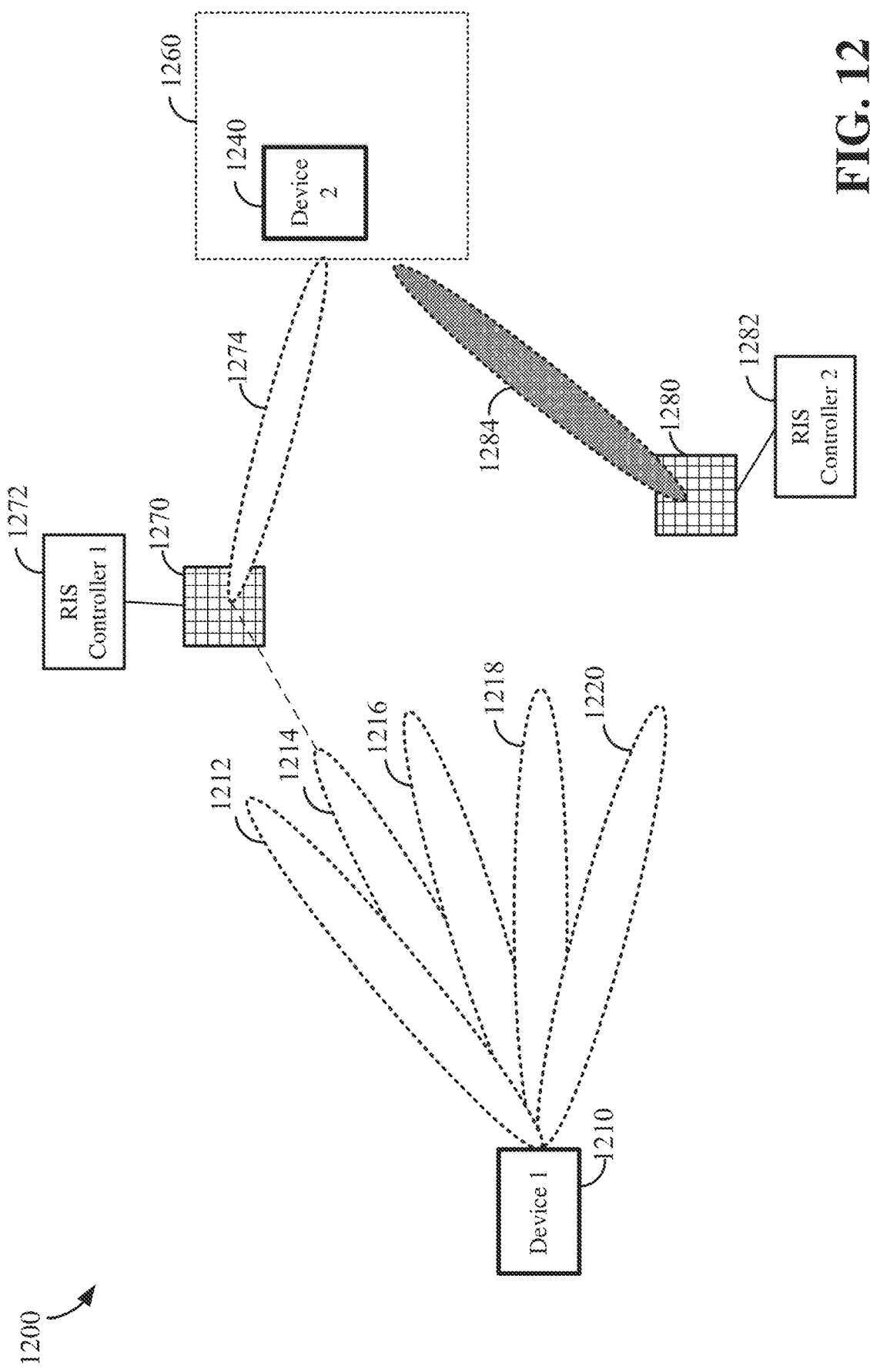
FIG. 12 is an example diagram illustrating the second interreference case when a first device is in communication with a second device via a RIS serving the second device, with other devices not served by the RIS, according to some aspects.

FIG. 12 is an example diagram 1200 illustrating the second interreference case when a first device is in communication with a second device via a RIS serving the second device, with other devices not served by the RIS, according to some aspects. In FIG. 12, a first device 1210 may be configured to utilize five different beams to wirelessly communicate in multiple different directions, respectively. In particular, the first device 1210 may be configured to transmit using a first beam 1212, a second beam 1214, a third beam 1216, a fourth beam 1218, and a fifth beam 1220, in five different directions, respectively. In some cases, the first device 1210 may be a base station.

A first RIS 1270 and a second RIS 1280 may be deployed to assist communication between the first device 1210 and other devices, and may be configured by a first RIS controller 1272 and a second RIS controller 1282, respectively. In FIG. 12, the first RIS 1270 may be a serving RIS that serves a second device 1240 to facilitate communication between the first device 1210 and the second device 1240. Hence, the first RIS 1270 may receive a signal from the first device 1210 and reflect the signal in a direction toward the second device 1240. For example, the first RIS 1270 may receive a signal transmitted using the second beam 1214 of the first device 1210, and reflect the signal using a beam 1274 of the first RIS 1270 toward the second device 1240. In FIG. 12, the second RIS 1280 does not serve the second device 1240 for the communication between the first device 1210 and the second device 1240.

If the second RIS 1280 not serving the second device 1240 utilizes a beam 1284 of the second RIS 1280, then the first RIS 1270 may reflect a signal (e.g., signal transmitted from the first device 1210) toward the second device 1240. The first device 1210 may identify that the second RIS 1280 does not serve the second device 1240 for communication between the first device 1210 and the second device 1240. Hence, such utilization of the beam 1284 of the second RIS 1280 not serving the second device 1240 may cause interference at the second device 1240. Hence, when the first device 1210 identifies that the second RIS 1280 does not serve the second device 1240, the first device 1210 may transmit, to the first RIS controller 1272, a RIS restriction indicator indicating a RIS beam direction and/or a zone 1260 toward which to restrict use of RIS beamforming of the second RIS 180, where the directions and/or zone 1260 correspond to the location of the second device 1240. When the first RIS controller 1272 receives the RIS restriction indicator, the RIS controller may restrict use of the beam 1284 of the second RIS 1280 toward the direction and/or the zone 1260 corresponding to the location of the second device 1240. By restricting the use of the beam 1284 of the second RIS 1280 toward the location of the second device 1240, the interference at the second device 1240 may be reduced.

In some cases, a first beam may cause interference on the second device when a second beam is present but may not cause interference on the second device when the second beam is not present. In these cases, beam restrictions may be utilized for one or more particular time periods, and may not be utilized for other time periods. In particular, one or more first time periods may be set such that the first beam may not be used during the one or more first time periods. Further, one or more second time periods may be set such that the first beam may be used during one or more second time periods different from the one or more first time periods. In an example, the one or more first time periods may include multiple periodic off-durations to periodically refrain from using the first beam. In this example, the one or more second time periods may include multiple periodic on-durations to periodically use the first beam. Hence, according to one approach, the first beam may be utilized during the periodic on-durations and may not be utilized during the periodic off-durations, where the periodic on-durations and the periodic off-durations may repeat cyclically. According to another approach, the first beam may be utilized during a particular time period P and may return to a default setting. According to another approach, the first beam may be in the default setting during a particular time period P and may be utilized after the particular time period P. The default setting may be refraining from utilizing the first beam or may be utilizing the first beam.

In an aspect, the first device (e.g., base station) may transmit to the controller of the RIS an indication (e.g., in the RIS restriction indicator) to indicate one or more first time periods for the RIS to refrain from utilizing one or more RIS beams of the RIS toward the at least one of the beam direction or the zone, such that the controller of the RIS may prevent the RIS from utilizing the one or more RIS beams toward the at least one of the beam direction or the zone during the one or more first time periods. The controller of the RIS may also enable the RIS to communicate using the one or more RIS beams toward the at least one of the beam direction or the zone during one or more second time periods different from the one or more first time periods. The one or more second time periods may be indicated by the indication (e.g., in the RIS restriction indicator).

Referring to FIG. 12, in an example, the first device 1210 may transmit the indication (e.g., in the RIS restriction indicator) to the second RIS controller 1282 to indicate one or more first time periods for the second RIS 1280 to refrain from utilizing the beam 1284 of the second RIS 1280 toward the beam direction to the second device 1240 and/or the zone 1260 that includes the second device 1240. When the beam 1274 of the first RIS 1270 is utilized, the beam 1284 of the second RIS 1280 may cause interference on the second device 1240. Hence, for example, the one or more first time periods may be the time periods when the beam 1274 of the first RIS 1270 is utilized. The second RIS controller 1282 may utilize the beam 1284 of the second RIS 1280 during one or more second periods that are different from the one or more first time periods. When the beam 1274 of the first RIS 1270 is not utilized, the beam 1284 of the second RIS 1280 may not cause interference on the second device 1240. Hence, for example, the one or more second periods may be the time periods when the first RIS controller 1272 is not activated or when the beam 1274 of the first RIS 1270 is not utilized. The one or more second time periods may also be indicated by the indication (e.g., in the RIS restriction indicator).

In an example, a direction of a first beam of a first RIS toward a second device may substantially overlap with a direction of a second beam of a second RIS toward a third device. In this case, utilization of the second beam of the second RIS may cause interference on the third device only during the utilization of the first beam of the first RIS toward the second device. Similarly, utilization of the first beam of the first RIS may cause interference on the second device only during the utilization of the second beam of the second RIS toward the third device.

Figure 13:
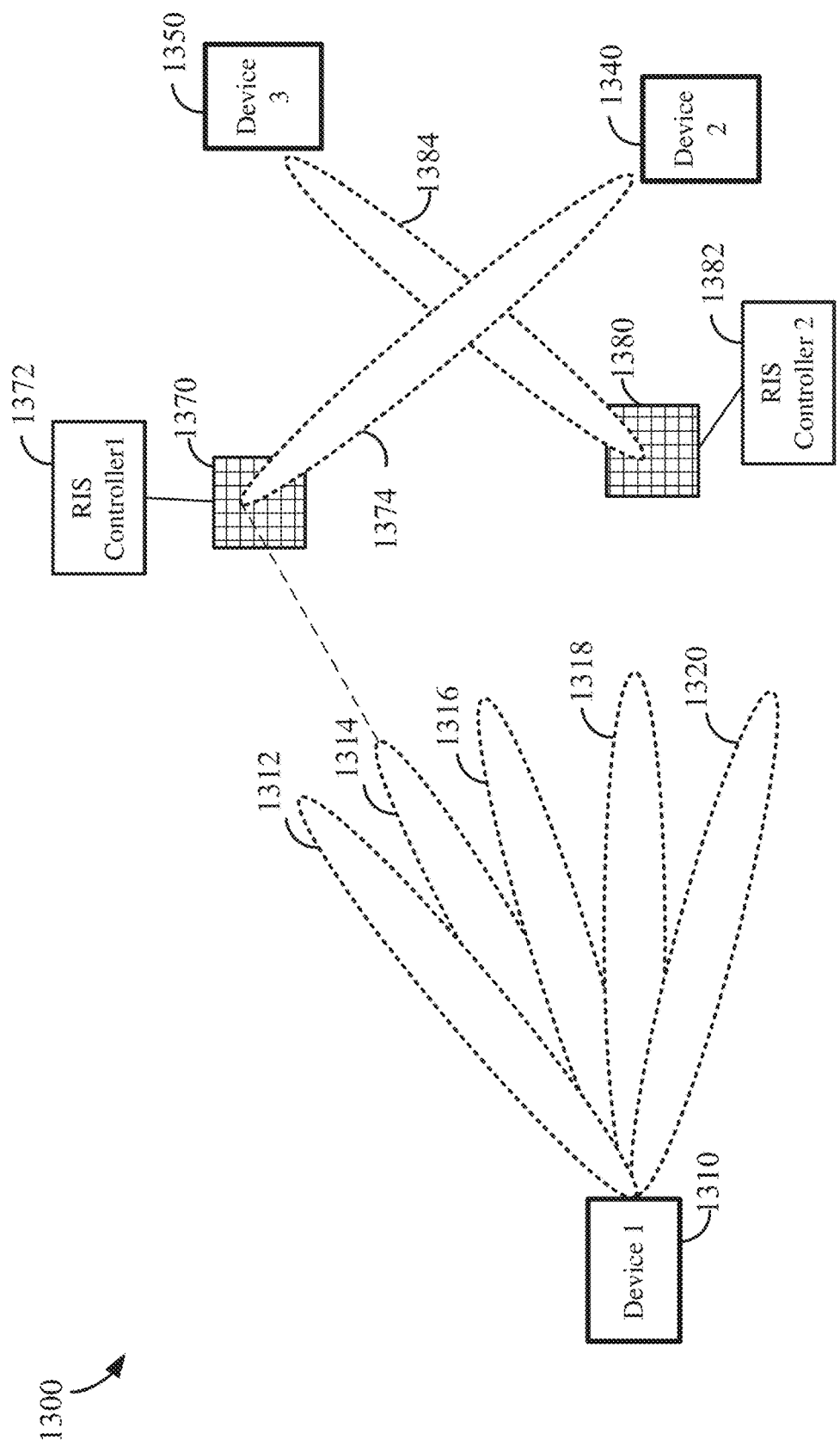
FIG. 13 is an example diagram illustrating the second interreference case when a first device is in communication with a second device via a RIS serving the second device, with other devices not served by the RIS, according to some aspects.

FIG. 13 is an example diagram 1300 illustrating the second interreference case when a first device is in communication with a second device via a RIS serving the second device, with other devices not served by the RIS, according to some aspects. In FIG. 13, a first device 1310 may be configured to utilize five different beams to wirelessly communicate in multiple different directions, respectively. In particular, the first device 1310 may be configured to transmit using a first beam 1312, a second beam 1314, a third beam 1316, a fourth beam 1318, and a fifth beam 1320, in five different directions, respectively. In some cases, the first device 1310 may be a base station.

A first RIS 1370 and a second RIS 1380 may be deployed to assist communication between the first device 1310 and other devices, and may be configured by a first RIS controller 1372 and a second RIS controller 1382, respectively. In FIG. 13, the first RIS 1370 may be a serving RIS that serves a second device 1340 to facilitate communication between the first device 1310 and the second device 1340. Hence, the first RIS 1370 may receive a signal from the first device 1310 and reflect the signal in a direction toward the second device 1340. For example, the first RIS 1370 may receive a signal transmitted using the second beam 1314 of the first device 1310, and reflect the signal using a beam 1374 of the first RIS 1370 toward the second device 1340. In FIG. 13, the second RIS 1380 does not serve the second device 1340 for the communication between the first device 1310 and the second device 1340.

In FIG. 13, a beam 1374 of the first RIS 1370 and a beam 1384 of the second RIS 1380 may intersect. Hence, if the first RIS 1370 and the second RIS 1380 simultaneously utilize the beam 1374 of the first RIS 1370 and the beam 1384 of the second RIS 1380, respectively, the second device 1340 and the third device 1350 may experience interferences. To reduce such interferences, the first RIS controller 1372 may restrict use of the beam 1374 of the first RIS controller 1372 while the beam 1384 of the second RIS controller 1382 is being utilized, and vice versa. For example, to restrict the use of the beam 1374, the first RIS controller 1372 may prevent the first RIS 1370 from utilizing the beam 1374 toward a direction of the second device 1340 during one or more first time periods. The first RIS controller 1372 may enable the first RIS 1370 to communicate using the beam 1374 during one or more second time periods different from the one or more first time periods. During the one or more second time periods, the beam 1384 of the second RIS controller 1382 may not be utilized, and thus may not cause interference with utilization of the beam 1374 of the first RIS 1370. Further, for example, to restrict the use of the beam 1384 of the second RIS 1380 during the one or more second time periods, the second RIS controller 1382 may prevent the second RIS 1380 from utilizing the beam 1384 toward a direction of the third device 1350 during the one or more second time periods during which the first RIS 1370 utilizes the beam 1374 of the first RIS 1370. The second RIS controller 1382 may enable the second RIS 1380 to communicate using the beam 1384 during the one or more first time periods during which the first RIS 1370 does not utilize the beam 1374 of the first RIS 1370.

Figure 14:
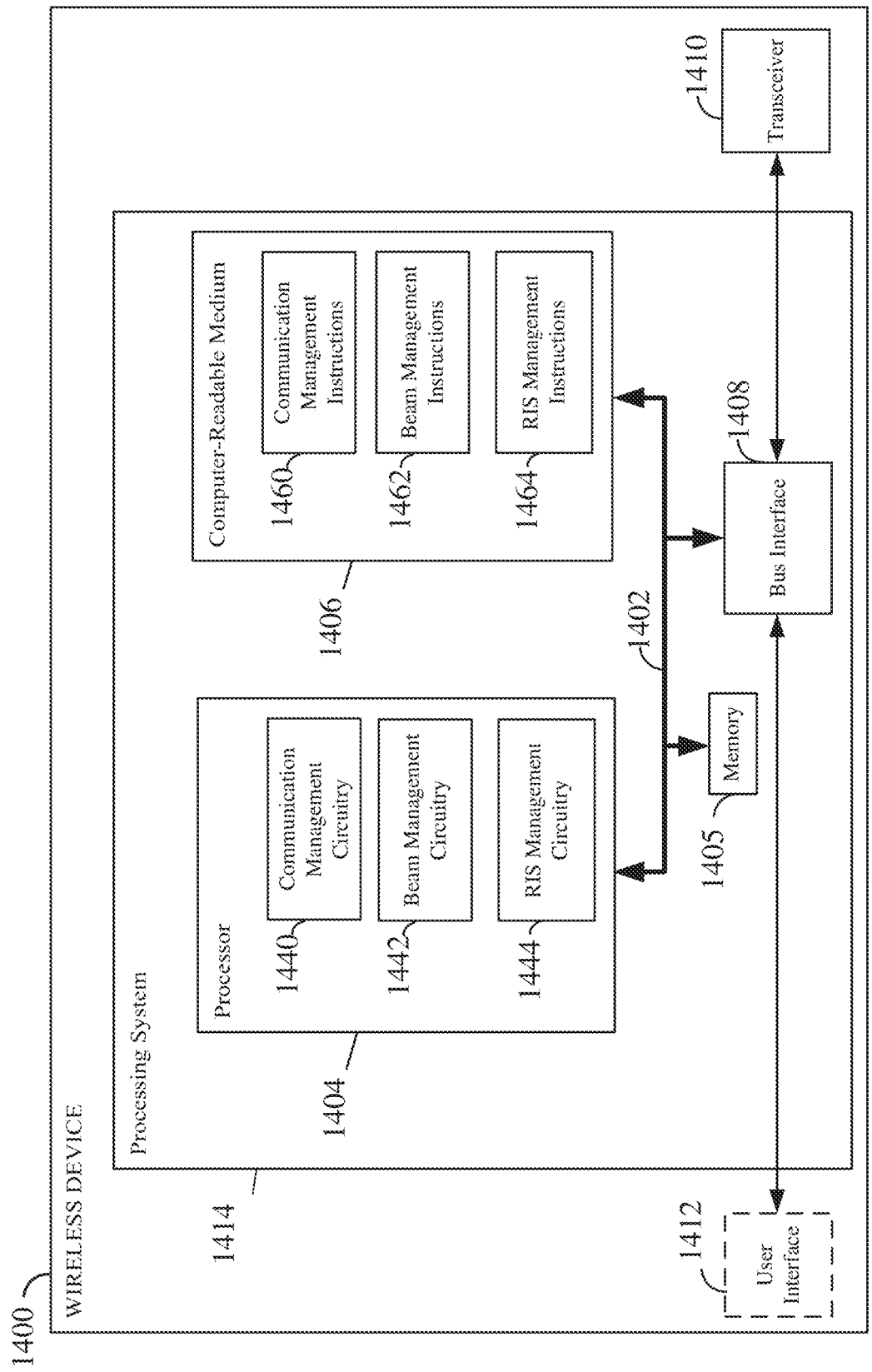
FIG. 14 is a block diagram conceptually illustrating an example of a hardware implementation for a wireless device according to some aspects.

FIG. 14 is a block diagram illustrating an example of a hardware implementation for a wireless device 1400 employing a processing system 1514. In an example, the wireless device 1400 may be a first device or a base station as illustrated in any one or more of FIGS. 1, 2, 3, 8, 9, 10, 11, 12, and/or 13. In an example, the wireless device 1400 may be a second device or a UE as illustrated in any one or more of FIGS. 1, 2, 3, 8, 9, 10, 11, 12, and/or 13.

The wireless device 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless device 1400 may be configured to perform any one or more of the functions described herein. That is, the processor 1404, as utilized in a wireless device 1400, may be used to implement any one or more of the processes and procedures described below and illustrated in FIGS. 15-18.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable storage medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium. Depending upon the nature of the apparatus, a user interface 1412 (e.g., keypad, display, speaker, microphone, joystick) may also be provided. Of course, such a user interface 1412 is optional, and may be omitted in some examples, such as a base station.

In some aspects of the disclosure, the processor 1404 may include communication management circuitry 1440 configured for various functions, including, for example, performing a first transmission using a first set of beams of the first device in response to an activated RIS for serving a second device to facilitate communication between the first device and the second device not being present. For example, the communication management circuitry 1440 may be configured to implement one or more of the functions described below in relation to FIGS. 15-16, including, e.g., blocks 1502 and 1608. The communication management circuitry 1440 may further be configured to execute communication management software/instructions 1450 stored in the computer-readable storage medium 1406 to perform one or more of the functions described below in relation to FIGS. 15-16, including, e.g., blocks 1502 and 1608.

In some aspects, the communication management circuitry 1440 may be configured for various functions, including, for example, performing a second transmission using a second set of beams of the first device in response to the activated RIS being present, the second set of beams being a subset of the first set of beams that excludes one or more beams of the first set of beams. For example, the communication management circuitry 1440 may be configured to implement one or more of the functions described below in relation to FIGS. 15-16, including, e.g., blocks 1504 and 1610. The communication management circuitry 1440 may further be configured to execute communication management software/instructions 1450 stored in the computer-readable storage medium 1406 to perform one or more of the functions described below in relation to FIGS. 15-16, including, e.g., blocks 1504 and 1610.

In some aspects, the communication management circuitry 1440 may be configured for various functions, including, for example, transmitting, to the second device, a first beam configuration indicating the first set of beams and a second beam configuration indicating the second set of beams. For example, the communication management circuitry 1440 may be configured to implement one or more of the functions described below in relation to FIG. 16, including, e.g., block 1604. The communication management circuitry 1440 may further be configured to execute communication management software/instructions 1450 stored in the computer-readable storage medium 1406 to perform one or more of the functions described below in relation to FIG. 16, including, e.g., block 1604.

In some aspects, the communication management circuitry 1440 may be configured for various functions, including, for example, transmitting, to the second device, a RIS presence indicator indicating whether the activated RIS is present. For example, the communication management circuitry 1440 may be configured to implement one or more of the functions described below in relation to FIG. 16, including, e.g., block 1606. The communication management circuitry 1440 may further be configured to execute communication management software/instructions 1450 stored in the computer-readable storage medium 1406 to perform one or more of the functions described below in relation to FIG. 16, including, e.g., block 1606.

In some aspects, the communication management circuitry 1440 may be configured for various functions, including, for example, performing a third transmission using the one or more excluded beams during one or more first time periods in response to the activated RIS being present. For example, the communication management circuitry 1440 may be configured to implement one or more of the functions described below in relation to FIG. 16, including, e.g., block 1612. The communication management circuitry 1440 may further be configured to execute communication management software/instructions 1450 stored in the computer-readable storage medium 1406 to perform one or more of the functions described below in relation to FIG. 16, including, e.g., block 1612.

In some aspects, the communication management circuitry 1440 may be configured for various functions, including, for example, transmitting, to a controller of a second RIS, an RIS restriction indicator indicating at least one of a RIS beam direction or a zone toward which to restrict use of RIS beamforming of the second RIS, the at least one of the direction or the zone corresponding to the location of the second device. For example, the communication management circuitry 1440 may be configured to implement one or more of the functions described below in relation to FIG. 17, including, e.g., block 1710. The communication management circuitry 1440 may further be configured to execute communication management software/instructions 1450 stored in the computer-readable storage medium 1406 to perform one or more of the functions described below in relation to FIG. 17, including, e.g., block 1710.

In some aspects, the communication management circuitry 1440 may be configured for various functions, including, for example, receiving a RIS presence indicator indicating whether an activated RIS serving a second device to facilitate communication between the first device and the second device is present. For example, the communication management circuitry 1440 may be configured to implement one or more of the functions described below in relation to FIGS. 18-19, including, e.g., blocks 1804 and 1904. The communication management circuitry 1440 may further be configured to execute communication management software/instructions 1450 stored in the computer-readable storage medium 1406 to perform one or more of the functions described below in relation to FIGS. 18-19, including, e.g., blocks 1804 and 1904.

In some aspects, the communication management circuitry 1440 may be configured for various functions, including, for example, communicating with the second device based on the first beam search when the RIS presence indicator indicates that the activated RIS is not present. For example, the communication management circuitry 1440 may be configured to implement one or more of the functions described below in relation to FIG. 19, including, e.g., block 1910. The communication management circuitry 1440 may further be configured to execute communication management software/instructions 1450 stored in the computer-readable storage medium 1406 to perform one or more of the functions described below in relation to FIG. 19, including, e.g., block 1910.

In some aspects, the communication management circuitry 1440 may be configured for various functions, including, for example, communicating with the second device based on the second beam search when the RIS presence indicator indicates that the activated RIS is present. For example, the communication management circuitry 1440 may be configured to implement one or more of the functions described below in relation to FIG. 19, including, e.g., block 1912. The communication management circuitry 1440 may further be configured to execute communication management software/instructions 1450 stored in the computer-readable storage medium 1406 to perform one or more of the functions described below in relation to FIG. 19, including, e.g., block 1912.

In some aspects of the disclosure, the processor 1404 may include beam management circuitry 1442 configured for various functions, including, for example, determining the one or more beams of the first set of beams to be excluded from the second set of beams based on at least one of a location of the second device or a history of communications between the first device and the second device, wherein the one or more beams are in one or more directions toward the second device. For example, the beam management circuitry 1442 may be configured to implement one or more of the functions described below in relation to FIG. 16, including, e.g., block 1602. The beam management circuitry 1442 may further be configured to execute beam management software/instructions 1452 stored in the computer-readable storage medium 1406 to perform one or more of the functions described below in relation to FIG. 16, including, e.g., block 1602.

In some aspects, the beam management circuitry 1442 may be configured for various functions, including, for example, refraining from using the one or more excluded beams during one or more second time periods different from the one or more first time periods in response to the activated RIS being present. For example, the beam management circuitry 1442 may be configured to implement one or more of the functions described below in relation to FIG. 16, including, e.g., block 1614. The beam management circuitry 1442 may further be configured to execute beam management software/instructions 1452 stored in the computer-readable storage medium 1406 to perform one or more of the functions described below in relation to FIG. 16, including, e.g., block 1614.

In some aspects, the beam management circuitry 1442 may be configured for various functions, including, for example, receiving a first beam configuration indicating a first set of beams of a second device and a second beam configuration indicating a second set of beams of the second device, the second set of beams being a subset of the first set of beams that excludes one or more beams of the first set of beams. For example, the beam management circuitry 1442 may be configured to implement one or more of the functions described below in relation to FIGS. 18-19, including, e.g., blocks 1802 and 1902. The beam management circuitry 1442 may further be configured to execute beam management software/instructions 1452 stored in the computer-readable storage medium 1406 to perform one or more of the functions described below in relation to FIGS. 18-19, including, e.g., blocks 1802 and 1902.

In some aspects, the beam management circuitry 1442 may be configured for various functions, including, for example, performing a first beam search on the first set of beams in response to the RIS presence indicator indicating that the activated RIS is not present. For example, the beam management circuitry 1442 may be configured to implement one or more of the functions described below in relation to FIGS. 18-19, including, e.g., blocks 1806 and 1906. The beam management circuitry 1442 may further be configured to execute beam management software/instructions 1452 stored in the computer-readable storage medium 1406 to perform one or more of the functions described below in relation to FIGS. 18-19, including, e.g., blocks 1806 and 1906.

In some aspects, the beam management circuitry 1442 may be configured for various functions, including, for example, performing a second beam search on the second set of beams in response to the RIS presence indicator indicating that the activated RIS is present. For example, the beam management circuitry 1442 may be configured to implement one or more of the functions described below in relation to FIGS. 18-19, including, e.g., blocks 1808 and 1908. The beam management circuitry 1442 may further be configured to execute beam management software/instructions 1452 stored in the computer-readable storage medium 1406 to perform one or more of the functions described below in relation to FIGS. 18-19, including, e.g., blocks 1808 and 1908.

In some aspects of the disclosure, the processor 1404 may include RIS management circuitry 1444 configured for various functions, including, for example, identifying a location of a third device. For example, the RIS management circuitry 1444 may be configured to implement one or more of the functions described below in relation to FIG. 17, including, e.g., block 1702. The RIS management circuitry 1444 may further be configured to execute communication management software/instructions 1450 stored in the computer-readable storage medium 1406 to perform one or more of the functions described below in relation to FIG. 17, including, e.g., block 1702.

In some aspects, the RIS management circuitry 1444 may be configured for various functions, including, for example, identifying the second third device not served by the RIS to facilitate communication between the first device and the second third device. For example, the RIS management circuitry 1444 may be configured to implement one or more of the functions described below in relation to FIG. 17, including, e.g., block 1704. The RIS management circuitry 1444 may further be configured to execute communication management software/instructions 1450 stored in the computer-readable storage medium 1406 to perform one or more of the functions described below in relation to FIG. 17, including, e.g., block 1704.

In some aspects, the RIS management circuitry 1444 may be configured for various functions, including, for example, identifying the second RIS not serving the second device to facilitate communication between the first device and the second device. For example, the RIS management circuitry 1444 may be configured to implement one or more of the functions described below in relation to FIG. 17, including, e.g., block 1706. The RIS management circuitry 1444 may further be configured to execute communication management software/instructions 1450 stored in the computer-readable storage medium 1406 to perform one or more of the functions described below in relation to FIG. 17, including, e.g., block 1706.

In some aspects, the RIS management circuitry 1444 may be configured for various functions, including, for example, identifying the RIS serving the second device to facilitate communication between the first device and the second device. For example, the RIS management circuitry 1444 may be configured to implement one or more of the functions described below in relation to FIG. 17, including, e.g., block 1708. The RIS management circuitry 1444 may further be configured to execute communication management software/instructions 1450 stored in the computer-readable storage medium 1406 to perform one or more of the functions described below in relation to FIG. 17, including, e.g., block 1708.

The processor 1404 is responsible for managing the bus 1402 and general processing, including the execution of software stored on the computer-readable storage medium 1406. The software, when executed by the processor 1404, causes the processing system 1414 to perform the various functions described below for any particular apparatus. The computer-readable storage medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1406. The computer-readable storage medium 1406 may be a non-transitory computer-readable storage medium. A non-transitory computer-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1406 may reside in the processing system 1414, external to the processing system 1414, or distributed across multiple entities including the processing system 1414. The computer-readable storage medium 1406 may be embodied in a computer program product. By way of example, a computer program product may include a computer-readable storage medium in packaging materials. Those skilled in the art will recognize how best to implement the described functionality presented throughout this disclosure depending on the particular application and the overall design constraints imposed on the overall system.

Figure 15:
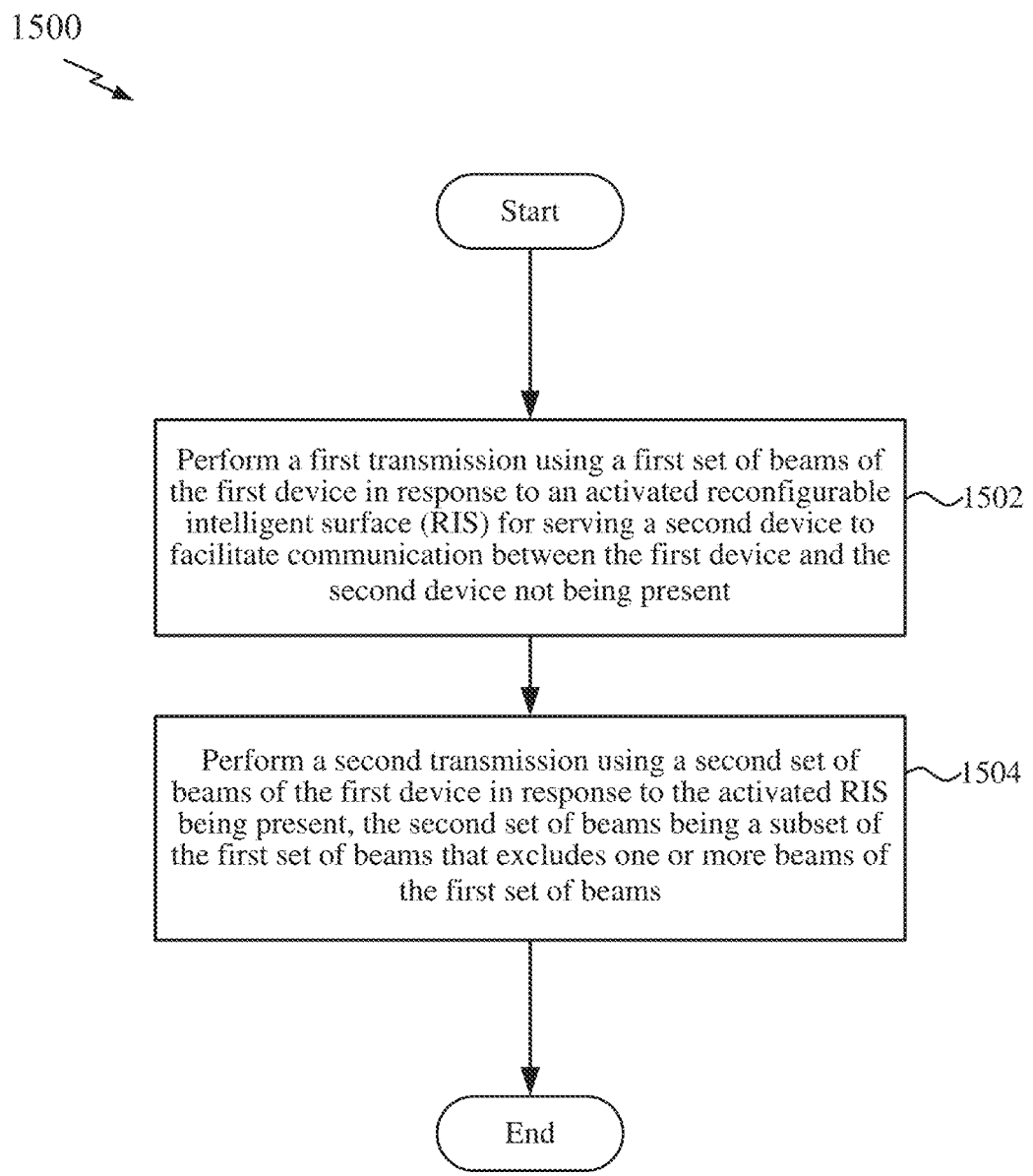
FIG. 15 is a flow chart illustrating an exemplary process for wireless communication by a wireless device according to some aspects.

FIG. 15 is a flow chart illustrating an exemplary process 1500 for wireless communication by a first device in accordance with some aspects of the present disclosure. As described below, some or all illustrated features may be omitted in a particular implementation within the scope of the present disclosure, and some illustrated features may not be required for implementation of all embodiments. In some examples, the process 1500 may be carried out by the first device that is the wireless device 1400 illustrated in FIG. 1400. In some examples, the process 1500 may be carried out by any suitable apparatus or means for carrying out the functions or algorithm described below.

At block 1502, the first device (e.g., wireless device 1400) may perform a first transmission using a first set of beams of the first device in response to an activated RIS for serving a second device to facilitate communication between the first device and the second device not being present. For example, the communication management circuitry 1440 shown and described above in connection with FIG. 14 may provide means for performing the first transmission using the first set of beams. In an aspect, the first device may be a base station or a first UE and the second device may be a second UE.

At block 1504, the first device may perform a second transmission using a second set of beams of the first device in response to the activated RIS being present, the second set of beams being a subset of the first set of beams that excludes one or more beams of the first set of beams. For example, the communication management circuitry 1440 shown and described above in connection with FIG. 14 may provide means for performing the second transmission using the second set of beams.

Figure 16:
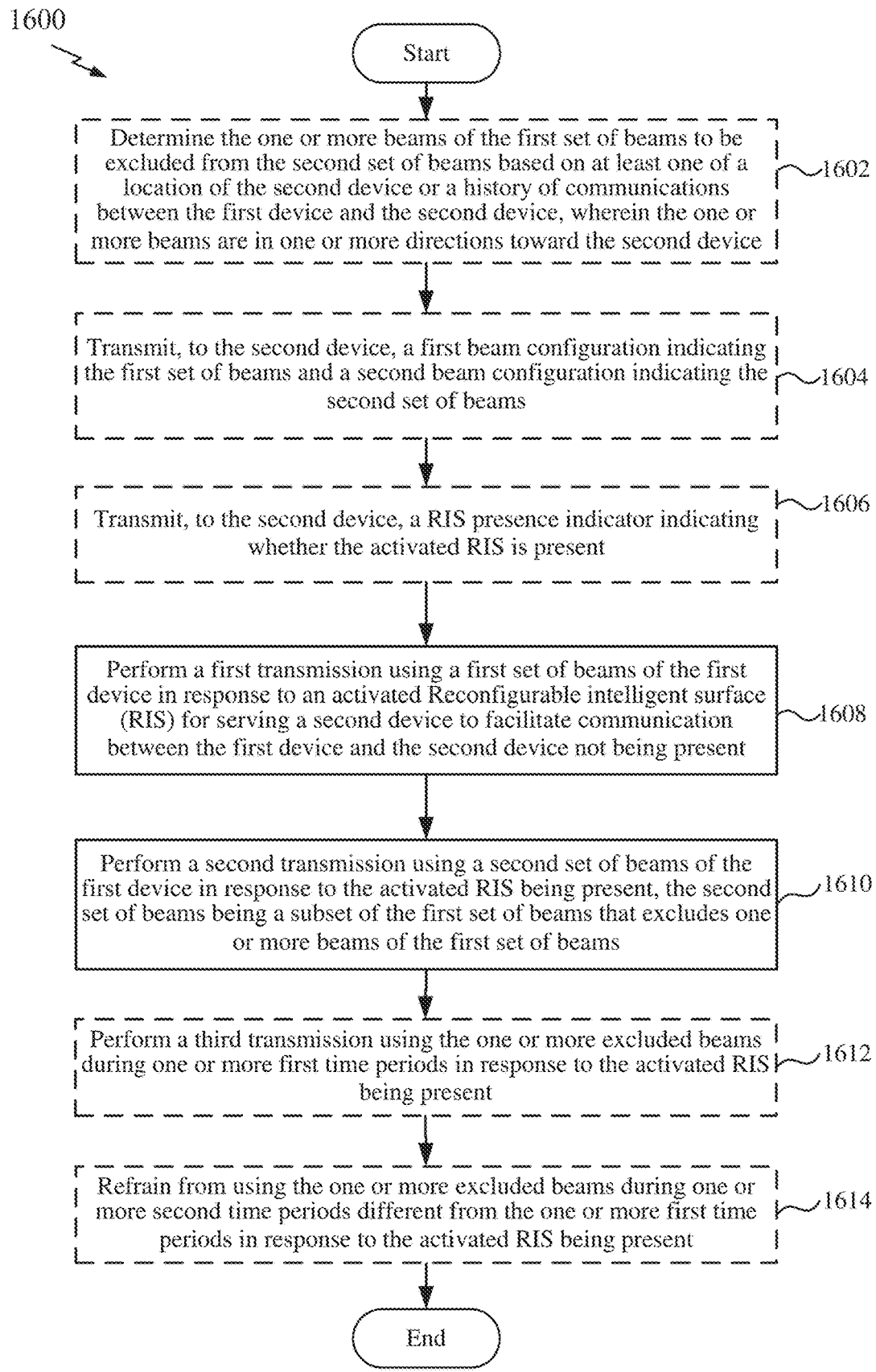
FIG. 16 is a flow chart illustrating an exemplary process for wireless communication by a wireless device according to some aspects.

FIG. 16 is a flow chart illustrating an exemplary process 1600 for wireless communication by a first device in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the first device that is the wireless device 1400 illustrated in FIG. 1400. In some examples, the process 1600 may be carried out by any suitable apparatus or means for carrying out the functions or algorithm described below.

In an aspect, at block 1602, the first device (e.g., wireless device 1400) may determine the one or more beams of the first set of beams to be excluded from the second set of beams based on at least one of a location of the second device or a history of communications between the first device and the second device, wherein the one or more beams are in one or more directions toward the second device. For example, the beam management circuitry 1442 shown and described above in connection with FIG. 14 may provide means for determining the one or more beams of the first set of beams to be excluded from the second set of beams. In an aspect, the second set of beams may be a subset of the first set of beams that excludes one or more beams of the first set of beams. In an aspect, the first device may be a base station or a first UE and the second device may be a second UE.

In an aspect, the one or more excluded beams may be in one or more directions toward a third device not served by the activated RIS to facilitate communication between the first device and the third device.

In an aspect, the history of communications may include at least one of a history of transmissions of data signals or a history of transmissions of a set of reference signals from the first device during a beam training to determine at least one beam of the first device corresponding to at least one reference signal with a highest signal strength observed by the third device within the set of reference signals, and the beam training may include reporting, by the third device, the at least one beam with the highest signal strength to the first device.

In an aspect, at block 1604, the first device may transmit, to the second device, a first beam configuration indicating the first set of beams and a second beam configuration indicating the second set of beams. For example, the communication management circuitry 1440 shown and described above in connection with FIG. 14 may provide means for transmitting the first beam configuration and the second beam configuration.

In an aspect, at block 1606, the first device may transmit, to the second device, a RIS presence indicator indicating whether the activated RIS is present. For example, the communication management circuitry 1440 shown and described above in connection with FIG. 14 may provide means for transmitting the RIS presence indicator.

In an aspect, the RIS presence indicator indicating that the activated RIS is not present may be configured to cause the second device to perform a first beam search based on the first set of beams, and the RIS presence indicator indicating that the activated RIS is present may be configured to cause the second device to perform a second beam search based on the second set of beams.

In an aspect, at least one of the first beam configuration, the second beam configuration, or the RIS presence indicator may be transmitted via at least one of an RRC message, a MAC-CE, or DCI.

At block 1608, the first device may perform a first transmission using a first set of beams of the first device in response to an activated RIS for serving a second device to facilitate communication between the first device and the second device not being present. For example, the communication management circuitry 1440 shown and described above in connection with FIG. 14 may provide means for performing the first transmission using the first set of beams. In an aspect, the activated RIS may not be present when no RIS serving the second device is present or when no RIS serving the second device is activated.

At block 1610, the first device may perform a second transmission using a second set of beams of the first device in response to the activated RIS being present, the second set of beams being a subset of the first set of beams that excludes one or more beams of the first set of beams. For example, the communication management circuitry 1440 shown and described above in connection with FIG. 14 may provide means for performing the second transmission using the second set of beams.

In an aspect, at block 1612, the first device may perform a third transmission using the one or more excluded beams during one or more first time periods in response to the activated RIS being present. For example, the communication management circuitry 1440 shown and described above in connection with FIG. 14 may provide means for performing the third transmission.

In an aspect, at block 1614, the first device may refrain from using the one or more excluded beams during one or more second time periods different from the one or more first time periods in response to the activated RIS being present. For example, the beam management circuitry 1442 shown and described above in connection with FIG. 14 may provide means for refrain from using the one or more excluded beams during the one or more second time periods.

In an aspect, the one or more first time periods may include a plurality of periodic off-durations to periodically refrain from using the one or more excluded beams, and the one or more second time periods may include a plurality of periodic on-durations to periodically perform the third transmission using the one or more excluded beams.

Figure 17:
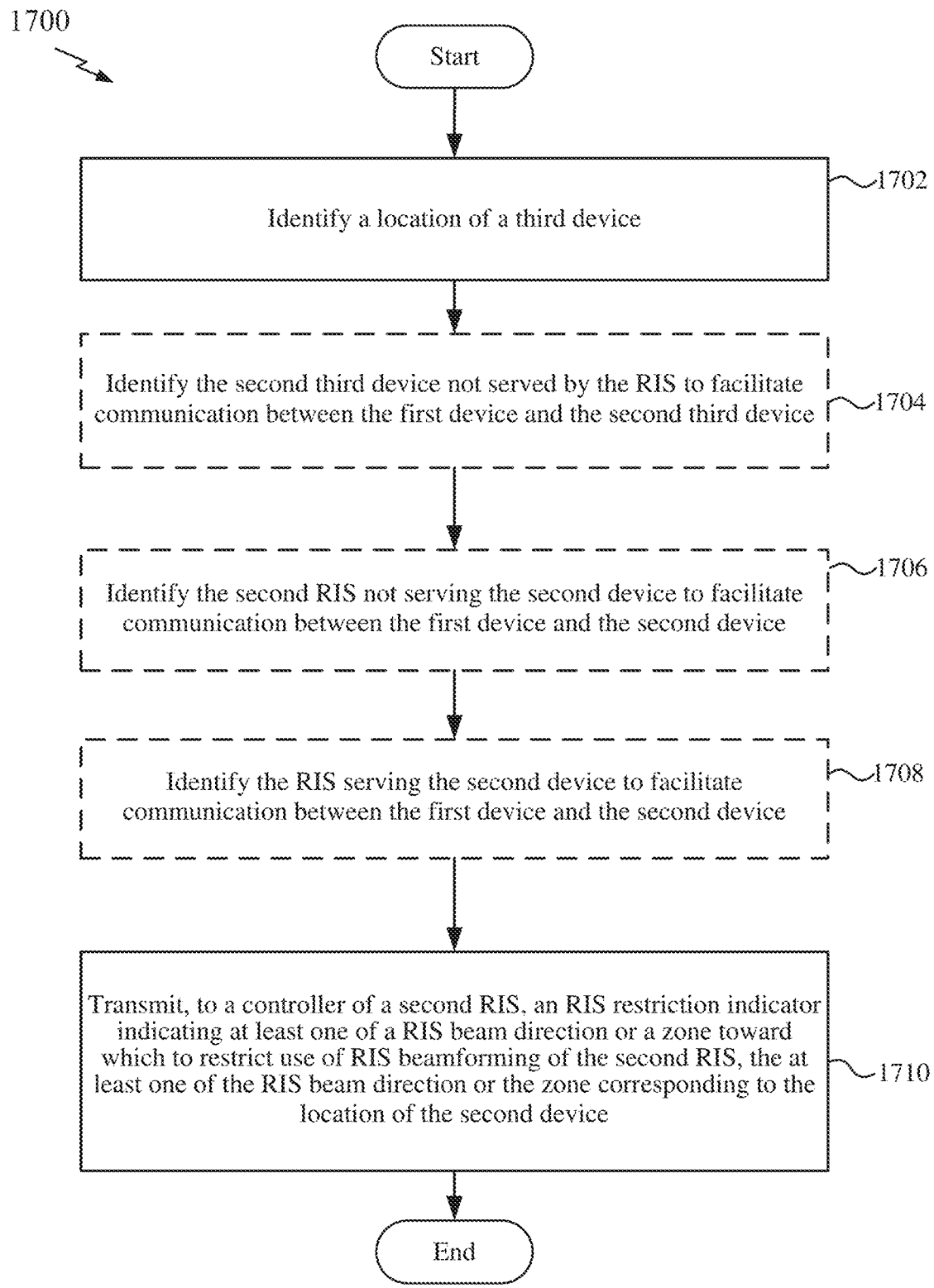
FIG. 17 is a flow chart illustrating an exemplary process for wireless communication by a wireless device according to some aspects.

FIG. 17 is a flow chart illustrating an exemplary process 1700 for wireless communication by a first device in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the first device that is the wireless device 1400 illustrated in FIG. 1400. In some examples, the process 1700 may be carried out by any suitable apparatus or means for carrying out the functions or algorithm described below. In one aspect, the process 1700 of FIG. 17 may continue from the process 1600 of FIG. 16. In this aspect, for example, block 1702 of FIG. 17 may take place after block 1604 of FIG. 16. In another aspect, the process 1700 of FIG. 17 may be performed independently from the process 1600 of FIG. 16.

At block 1702, the first device (e.g., wireless device 1400) may identify a location of a third device. For example, the RIS management circuitry 1444 shown and described above in connection with FIG. 14 may provide means for identifying the location of the third device.

In an aspect, at block 1704, where the second RIS is the RIS serving the second device to facilitate communication between the first device and the second device, the first device may identify the second third device not served by the RIS to facilitate communication between the first device and the second third device. For example, the RIS management circuitry 1444 shown and described above in connection with FIG. 14 may provide means for identifying the second third device not served by the RIS.

In another aspect, at block 1706, where the third device is the second device, the first device may identify the second RIS not serving the second device to facilitate communication between the first device and the second device. For example, the RIS management circuitry 1444 shown and described above in connection with FIG. 14 may provide means for identifying the second RIS not serving the second device. In this aspect, at block 1708, the first device may identify the RIS serving the second device to facilitate communication between the first device and the second device. For example, the RIS management circuitry 1444 shown and described above in connection with FIG. 14 may provide means for identifying the RIS serving the second device.

At block 1710, the first device may transmit, to a controller of a second RIS, an RIS restriction indicator indicating at least one of a RIS beam direction or a zone toward which to restrict use of RIS beamforming of the second RIS, the at least one of the RIS beam direction or the zone corresponding to the location of the second device. For example, the communication management circuitry 1440 shown and described above in connection with FIG. 14 may provide means for transmitting the RIS restriction indicator.

In an aspect, the RIS restriction indicator may indicate one or more first time periods for the RIS to refrain from utilizing one or more RIS beams of the second RIS toward the at least one of the beam direction or the zone. In an aspect, the RIS restriction indicator may further indicate one or more second time periods for the second RIS to utilize the one or more RIS beams toward the at least one of the beam direction or the zone. In an aspect, the one or more first time periods may include a plurality of periodic off-durations to periodically refrain from utilizing the one or more RIS beams toward the at least one of the beam direction or the zone.

In one configuration, the wireless device 1400 for wireless communication includes means for performing a first transmission using a first set of beams of the first device in response to an activated RIS for serving a second device to facilitate communication between the first device and the second device not being present, and means for performing a second transmission using a second set of beams of the first device in response to the activated RIS being present, the second set of beams being a subset of the first set of beams that excludes one or more beams of the first set of beams. In one aspect, the aforementioned means may be the processor(s) 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 3, 8, 9, 10, 11, 12, and/or 13, and utilizing, for example, the processes and/or algorithms described herein in relation to FIGS. 15, 16, and/or 17.

Figure 18:
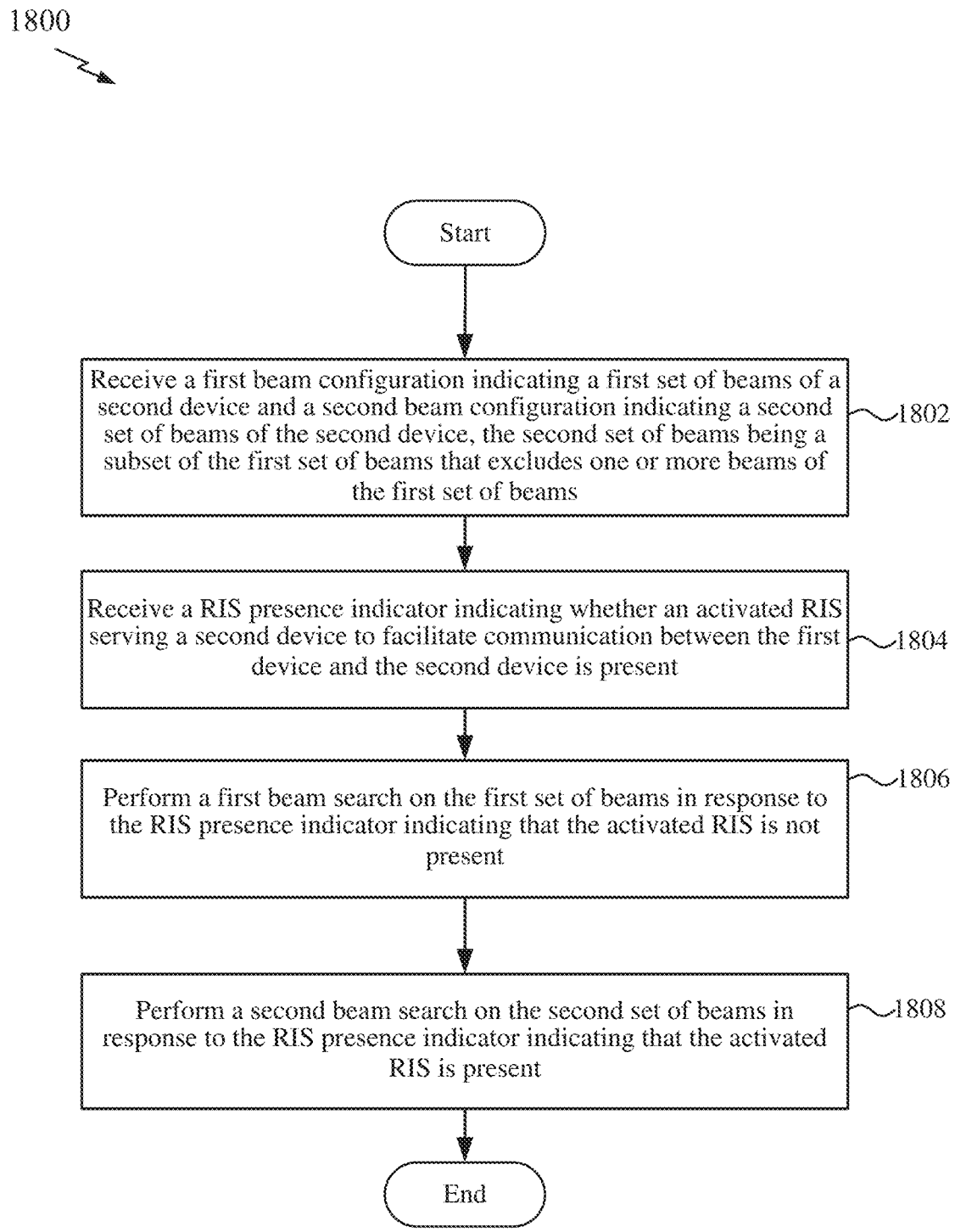
FIG. 18 is a flow chart illustrating an exemplary process for wireless communication by a wireless device according to some aspects.

FIG. 18 is a flow chart illustrating an exemplary process 1800 for wireless communication by a first device in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the first device that is the wireless device 1400 illustrated in FIG. 1400. In some examples, the process 1800 may be carried out by any suitable apparatus or means for carrying out the functions or algorithm described below.

At block 1802, the first device (e.g., wireless device 1400) may receive a first beam configuration indicating a first set of beams of a second device and a second beam configuration indicating a second set of beams of the second device, the second set of beams being a subset of the first set of beams that excludes one or more beams of the first set of beams. For example, the beam management circuitry 1442 shown and described above in connection with FIG. 14 may provide means for receiving the first beam configuration and the second beam configuration. In an aspect, the first device may be a first UE and the second device may be a base station or a second UE.

At block 1804, the first device may receive a RIS presence indicator indicating whether an activated RIS serving a second device to facilitate communication between the first device and the second device is present. For example, the communication management circuitry 1440 shown and described above in connection with FIG. 14 may provide means for receiving the RIS presence indicator.

At block 1806, the first device may perform a first beam search on the first set of beams in response to the RIS presence indicator indicating that the activated RIS is not present. For example, the beam management circuitry 1442 shown and described above in connection with FIG. 14 may provide means for performing the first beam search.

At block 1808, the first device may perform a second beam search on the second set of beams in response to the RIS presence indicator indicating that the activated RIS is present. For example, the beam management circuitry 1442 shown and described above in connection with FIG. 14 may provide means for performing the second beam search.

Figure 19:
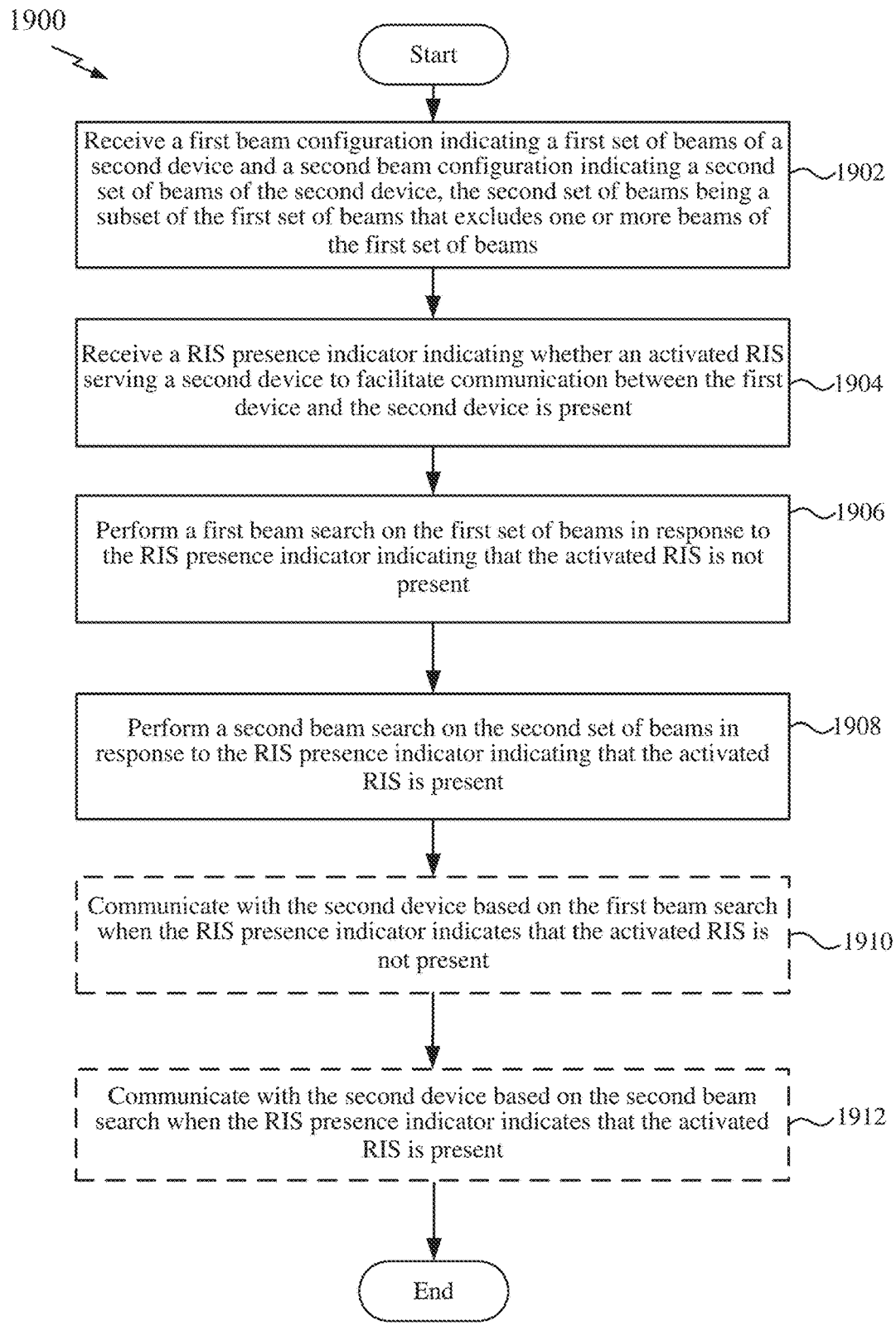
FIG. 19 is a flow chart illustrating an exemplary process for wireless communication by a wireless device according to some aspects.

FIG. 19 is a flow chart illustrating an exemplary process 1900 for wireless communication by a first device in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the first device that is the wireless device 1400 illustrated in FIG. 1400. In some examples, the process 1900 may be carried out by any suitable apparatus or means for carrying out the functions or algorithm described below.

At block 1902, the first device (e.g., wireless device 1400) may receive a first beam configuration indicating a first set of beams of a second device and a second beam configuration indicating a second set of beams of the second device, the second set of beams being a subset of the first set of beams that excludes one or more beams of the first set of beams. For example, the beam management circuitry 1442 shown and described above in connection with FIG. 14 may provide means for receiving the first beam configuration and the second beam configuration. In an aspect, the first device may be a first UE and the second device may be a base station or a second UE.

At block 1904, the first device may receive a RIS presence indicator indicating whether an activated RIS serving a second device to facilitate communication between the first device and the second device is present. For example, the communication management circuitry 1440 shown and described above in connection with FIG. 14 may provide means for receiving the RIS presence indicator.

In an aspect, at least one of the first beam configuration, the second beam configuration, or the RIS presence indicator may be received via at least one of an RRC message, a media MAC-CE, or DCI.

At block 1906, the first device may perform a first beam search on the first set of beams in response to the RIS presence indicator indicating that the activated RIS is not present. For example, the beam management circuitry 1442 shown and described above in connection with FIG. 14 may provide means for performing the first beam search.

At block 1908, the first device may perform a second beam search on the second set of beams in response to the RIS presence indicator indicating that the activated RIS is present. For example, the beam management circuitry 1442 shown and described above in connection with FIG. 14 may provide means for performing the second beam search.

In an aspect, the activated RIS may not be not present when no RIS serving the second device is present or when no RIS serving the second device is activated.

In an aspect, at block 1910, the first device may communicate with the second device based on the first beam search when the RIS presence indicator indicates that the activated RIS is not present. For example, the communication management circuitry 1440 shown and described above in connection with FIG. 14 may provide means for communicating with the second device based on the first beam search.

In an aspect, at block 1912, the first device may communicate with the second device based on the second beam search when the RIS presence indicator indicates that the activated RIS is present. For example, the communication management circuitry 1440 shown and described above in connection with FIG. 14 may provide means for communicating with the second device based on the second beam search.

In one configuration, the wireless device 1400 for wireless communication includes means for receiving a first beam configuration indicating a first set of beams of a second device and a second beam configuration indicating a second set of beams of the second device, the second set of beams being a subset of the first set of beams that excludes one or more beams of the first set of beams, means for receiving a RIS presence indicator indicating whether an activated RIS serving a second device to facilitate communication between the first device and the second device is present, means for performing a first beam search on the first set of beams in response to the RIS presence indicator indicating that the activated RIS is not present, and means for performing a second beam search on the second set of beams in response to the RIS presence indicator indicating that the activated RIS is present. In one aspect, the aforementioned means may be the processor(s) 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 3, 8, 9, 10, 11, 12, and/or 13, and utilizing, for example, the processes and/or algorithms described herein in relation to FIGS. 18 and/or 19.

Figure 20:
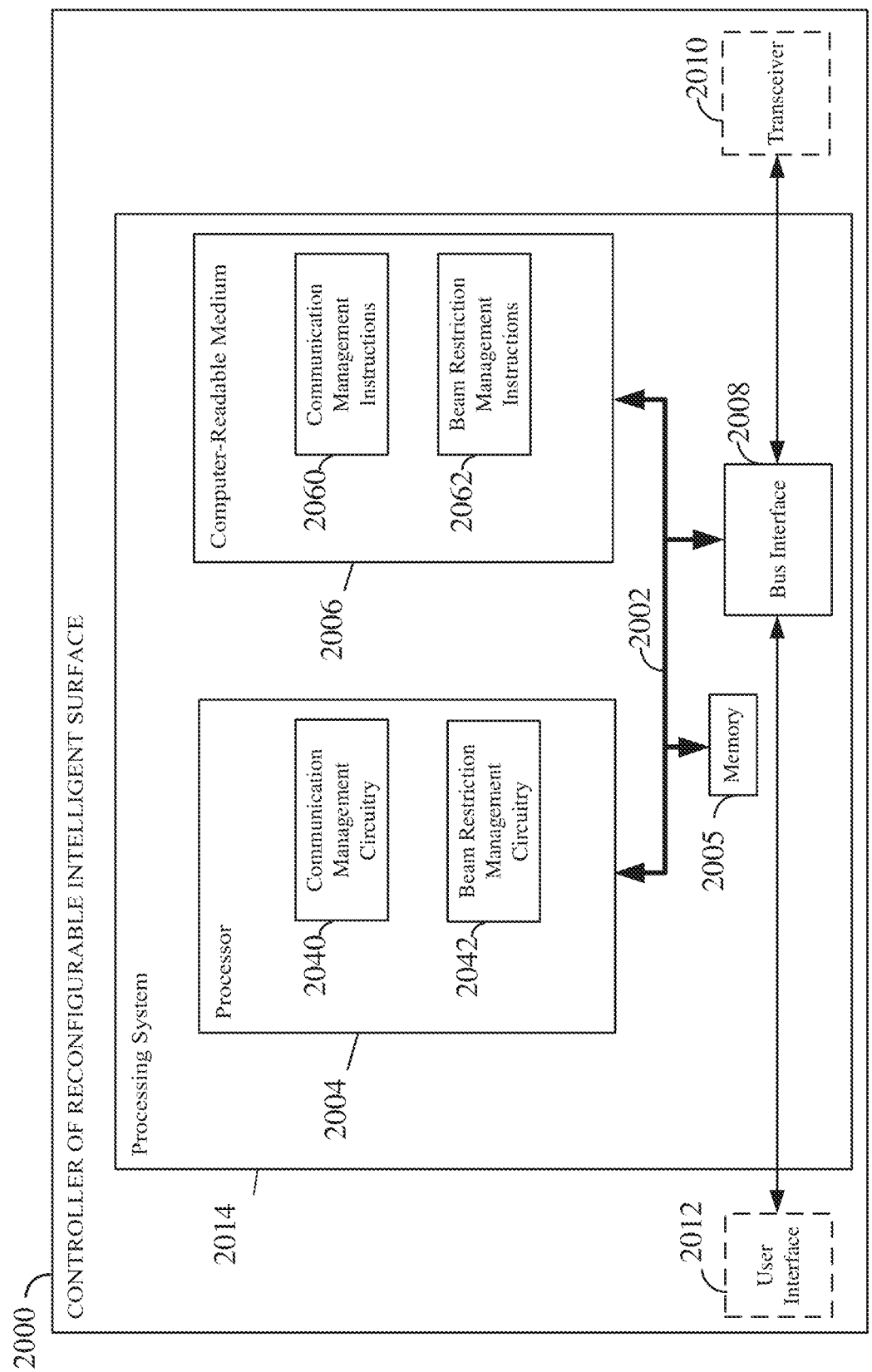
FIG. 20 is a block diagram conceptually illustrating an example of a hardware implementation for a controller of a RIS according to some aspects.

FIG. 20 is a conceptual diagram illustrating an example of a hardware implementation for an exemplary controller 2000 of a RIS employing a processing system 2014. In accordance with various aspects of the disclosure, an element, or any portion of an element, or any combination of elements may be implemented with a processing system 2014 that includes one or more processors 2004. For example, the controller 2000 of the RIS may be the controller of the RIS as illustrated in any one or more of FIGS. 8, 9, 10, 11, 12, and/or 13.

The processing system 2014 may be substantially the same as the processing system 714 illustrated in FIG. 7, including a bus interface 2008, a bus 2002, memory 2005, a processor 2004, and a computer-readable storage medium 2006. Furthermore, the controller 2000 of the RIS may include a user interface 2012 and a transceiver 2010 substantially similar to those described above in FIG. 14. That is, the processor 2004, as utilized in the controller 2000 of the RIS, may be used to implement any one or more of the processes described below and illustrated in FIGS. 21 and 22.

In some aspects of the disclosure, the processor 2004 may include communication management circuitry 2040 configured for various functions, including, for example, receiving, from a first device, an RIS restriction indicator indicating at least one of a beam direction or a zone toward which to restrict use of RIS beamforming of the RIS, the at least one of the beam direction or the zone corresponding to a location of a second device. For example, the communication management circuitry 2040 may be configured to implement one or more of the functions described below in relation to FIGS. 21-22, including, e.g., blocks 2102 and 2202. The communication management circuitry 2040 may further be configured to execute communication management software/instructions 1450 stored in the computer-readable storage medium 2006 to perform one or more of the functions described below in relation to FIGS. 21-22, including, e.g., blocks 2102 and 2202.

In some aspects, the communication management circuitry 2040 may be configured for various functions, including, for example, enabling the RIS to communicate using the one or more RIS beams toward the at least one of the beam direction or the zone during one or more second time periods different from the one or more first time periods. For example, the communication management circuitry 2040 may be configured to implement one or more of the functions described below in relation to FIG. 22, including, e.g., block 2208. The communication management circuitry 2040 may further be configured to execute communication management software/instructions 1450 stored in the computer-readable storage medium 2006 to perform one or more of the functions described below in relation to FIG. 22, including, e.g., block 2208.

In some aspects of the disclosure, the processor 2004 may include beam restriction management circuitry 2042 configured for various functions, including, for example, restrict use of one or more RIS beams of the RIS toward the at least one of the beam direction or the zone based on the RIS restriction indicator. For example, the beam restriction management circuitry 2042 may be configured to implement one or more of the functions described below in relation to FIGS. 21-22, including, e.g., blocks 2104 and 2204. The beam restriction management circuitry 2042 may further be configured to execute communication management software/instructions 1450 stored in the computer-readable storage medium 2006 to perform one or more of the functions described below in relation to FIGS. 21-22, including, e.g., blocks 2104 and 2204.

In some aspects, the beam restriction management circuitry 2042 may be configured for various functions, including, for example, preventing the RIS from utilizing the one or more RIS beams toward the at least one of the beam direction or the zone during the one or more first time periods. For example, the beam restriction management circuitry 2042 may be configured to implement one or more of the functions described below in relation to FIG. 22, including, e.g., block 2206. The beam restriction management circuitry 2042 may further be configured to execute communication management software/instructions 1450 stored in the computer-readable storage medium 2006 to perform one or more of the functions described below in relation to FIG. 22, including, e.g., block 2206.

Figure 21:
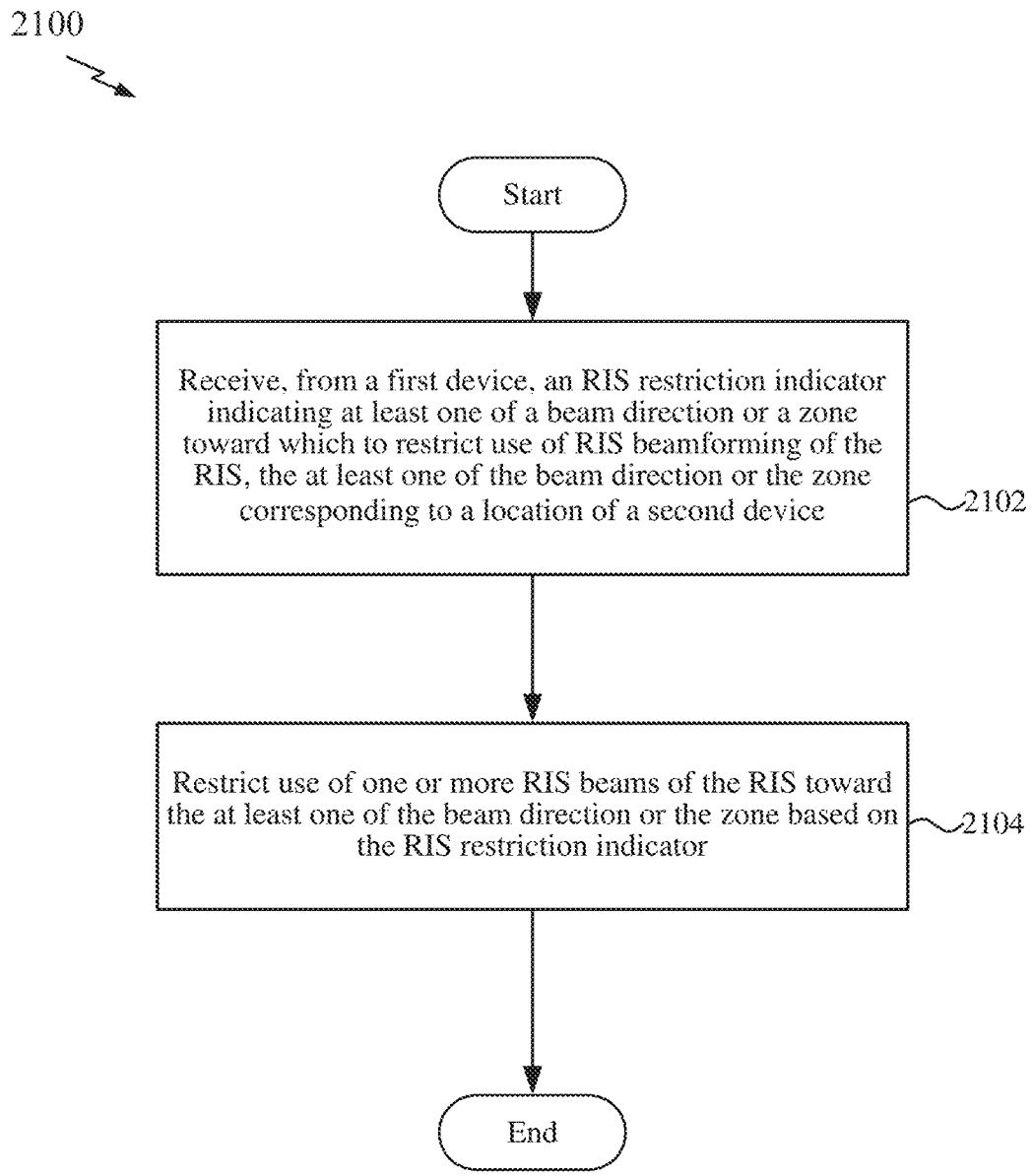
FIG. 21 is a flow chart illustrating an exemplary process for wireless communication by a controller of a RIS according to some aspects.

FIG. 21 is a flow chart illustrating an exemplary process 2100 for wireless communication by a controller of a RIS in accordance with some aspects of the present disclosure. As described below, some or all illustrated features may be omitted in a particular implementation within the scope of the present disclosure, and some illustrated features may not be required for implementation of all embodiments. In some examples, the process 2100 may be carried out by the controller 2000 of the RIS illustrated in FIG. 20. In some examples, the process 2100 may be carried out by any suitable apparatus or means for carrying out the functions or algorithm described below.

At block 2102, the controller of the RIS may receive, from a first device, an RIS restriction indicator indicating at least one of a beam direction or a zone toward which to restrict use of RIS beamforming of the RIS, the at least one of the beam direction or the zone corresponding to a location of a second device. For example, the communication management circuitry 2040 shown and described above in connection with FIG. 20 may provide means for receiving the RIS restriction indicator.

At block 2104, the controller of the RIS may restrict use of one or more RIS beams of the RIS toward the at least one of the beam direction or the zone based on the RIS restriction indicator. For example, the beam restriction management circuitry 2042 shown and described above in connection with FIG. 20 may provide means for restricting the use of the one or more RIS beams.

Figure 22:
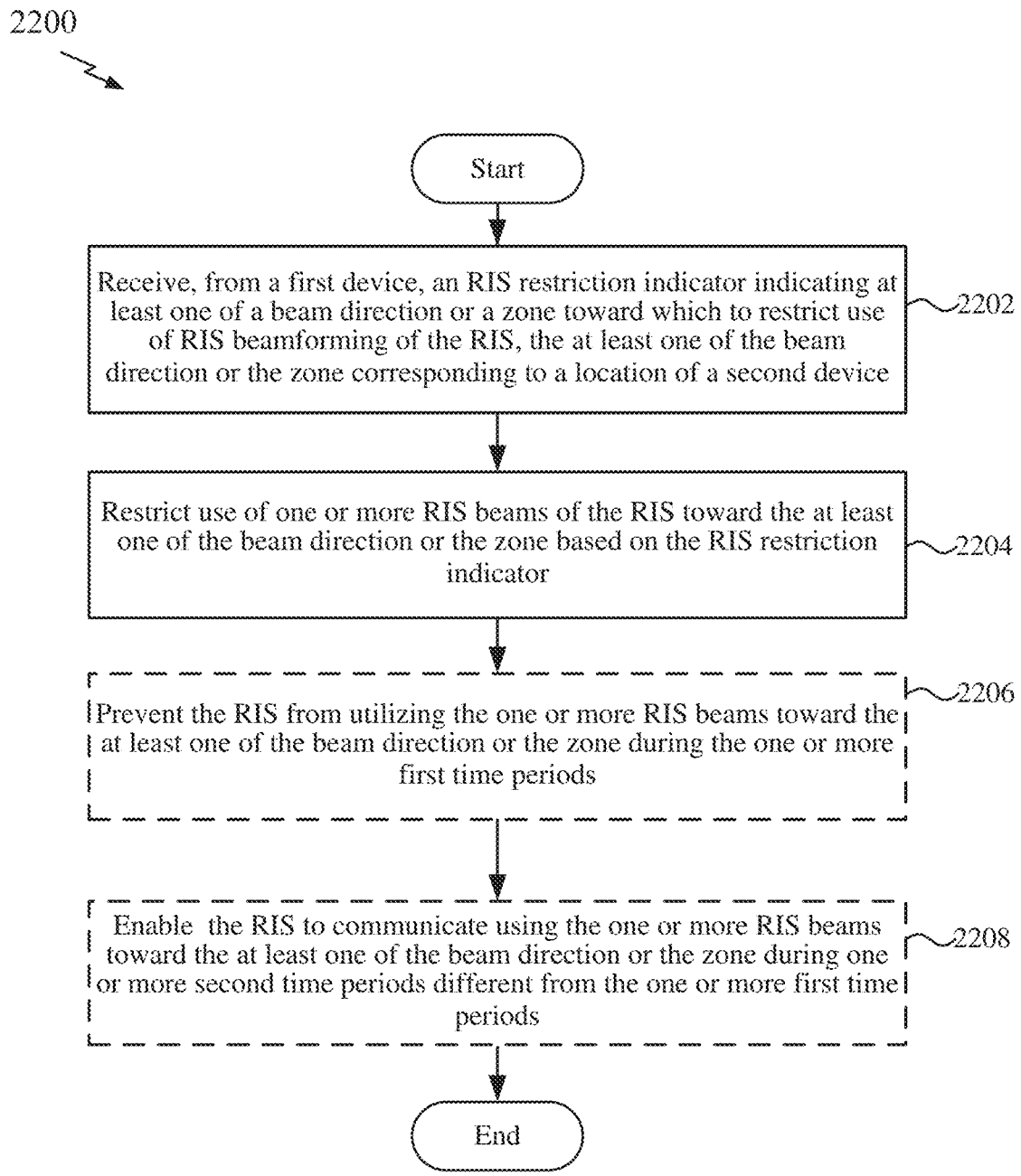
FIG. 22 is a flow chart illustrating an exemplary process for wireless communication by a controller of a RIS according to some aspects.

FIG. 22 is a flow chart illustrating an exemplary process 2200 for wireless communication by a controller of a RIS in accordance with some aspects of the present disclosure. As described below, some or all illustrated features may be omitted in a particular implementation within the scope of the present disclosure, and some illustrated features may not be required for implementation of all embodiments. In some examples, the process 2200 may be carried out by the controller 2000 of the RIS illustrated in FIG. 20. In some examples, the process 2200 may be carried out by any suitable apparatus or means for carrying out the functions or algorithm described below.

At block 2202, the controller of the RIS may receive, from a first device, an RIS restriction indicator indicating at least one of a beam direction or a zone toward which to restrict use of RIS beamforming of the RIS, the at least one of the beam direction or the zone corresponding to a location of a second device. For example, the communication management circuitry 2040 shown and described above in connection with FIG. 20 may provide means for receiving the RIS restriction indicator.

At block 2204, the controller of the RIS may restrict use of one or more RIS beams of the RIS toward the at least one of the beam direction or the zone based on the RIS restriction indicator. For example, the beam restriction management circuitry 2042 shown and described above in connection with FIG. 20 may provide means for restricting the use of the one or more RIS beams.

In an aspect, the RIS restriction indicator may indicate one or more first time periods for the RIS to refrain from utilizing one or more RIS beams of the RIS toward the at least one of the beam direction or the zone. In this aspect, at block 2206, the controller of the RIS may prevent the RIS from utilizing the one or more RIS beams toward the at least one of the beam direction or the zone during the one or more first time periods. For example, the beam restriction management circuitry 2042 shown and described above in connection with FIG. 20 may provide means for preventing the RIS from utilizing the one or more RIS beams. In an aspect, at block 2208, the controller of the RIS may enable the RIS to communicate using the one or more RIS beams toward the at least one of the beam direction or the zone during one or more second time periods different from the one or more first time periods. For example, the communication management circuitry 2040 shown and described above in connection with FIG. 20 may provide means for enabling the RIS to communicate using the one or more RIS beams.

In one configuration, the controller 2000 of the RIS for wireless communication includes means for receiving, from a first device, an RIS restriction indicator indicating at least one of a beam direction or a zone toward which to restrict use of RIS beamforming of the RIS, the at least one of the beam direction or the zone corresponding to a location of a second device, and means for restricting use of one or more RIS beams of the RIS toward the at least one of the beam direction or the zone based on the RIS restriction indicator. In one aspect, the aforementioned means may be the processor(s) 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS. 8, 9, 10, 11, 12, and/or 13, and utilizing, for example, the processes and/or algorithms described herein in relation to FIGS. 21 and/or 22.

The following provides an overview of several aspects of the present disclosure.

Aspect 1: A method of wireless communication by a first device, comprising: performing a first transmission using a first set of beams of the first device in response to an activated reconfigurable intelligent surface (RIS) for serving a second device to facilitate communication between the first device and the second device not being present; and performing a second transmission using a second set of beams of the first device in response to the activated RIS being present, the second set of beams being a subset of the first set of beams that excludes one or more beams of the first set of beams.

Aspect 2: The method of aspect 1, wherein the one or more excluded beams are in one or more directions toward a third device not served by the activated RIS to facilitate communication between the first device and the third device.

Aspect 3: The method of aspect 2, further comprising: determining the one or more beams of the first set of beams to be excluded from the second set of beams based on at least one of a location of the third device or a history of communications between the first device and the third device, wherein the one or more excluded beams are in one or more directions toward the third device.

Aspect 4: The method of aspect 3, wherein the history of communications includes at least one of a history of transmissions of data signals or a history of transmissions of a set of reference signals from the first device during a beam training to determine at least one beam of the first device corresponding to at least one reference signal with a highest signal strength observed by the third device within the set of reference signals, and wherein the beam training includes reporting, by the third device, the at least one beam with the highest signal strength to the first device:

Aspect 5: The method of any one of aspects 1 through 4, wherein the activated RIS is not present when no RIS serving the second device is present or when no RIS serving the second device is activated.

Aspect 6: The method of any one of aspects 1 through 5, further comprising: transmitting, to the second device, a first beam configuration indicating the first set of beams and a second beam configuration indicating the second set of beams; and transmitting, to the second device, a RIS presence indicator indicating whether the activated RIS is present, wherein the RIS presence indicator indicating that the activated RIS is not present is configured to cause the second device to perform a first beam search based on the first set of beams, and wherein the RIS presence indicator indicating that the activated RIS is present is configured to cause the second device to perform a second beam search based on the second set of beams.

Aspect 7: The method of aspect 6, wherein at least one of the first beam configuration, the second beam configuration, or the RIS presence indicator is transmitted via at least one of a radio resource control (RRC) message, a media access control control element (MAC-CE), or downlink control information (DCI).

Aspect 8: The method of any one of aspects 1 through 7, wherein the first device is a base station or a first user equipment (UE) and the second device is a second UE.

Aspect 9: The method of any one of aspects 1 through 8, further comprising: refraining from using the one or more excluded beams during one or more first time periods during which the activated RIS is present; and performing a third transmission using the one or more excluded beams during one or more second time periods during which the activated RIS is not present.

Aspect 10: The method of aspect 9, wherein the one or more first time periods include a plurality of periodic off-durations to periodically refrain from using the one or more excluded beams, and wherein the one or more second time periods include a plurality of periodic on-durations to periodically perform the third transmission using the one or more excluded beams.

Aspect 11: The method of any one of aspects 1 through 10, further comprising: identifying a location of a third device; and transmitting, to a controller of a second RIS, an RIS restriction indicator indicating at least one of a RIS beam direction or a zone toward which to restrict use of RIS beamforming of the second RIS, the at least one of the RIS beam direction or the zone corresponding to the location of the second device.

Aspect 12: The method of aspect 11, wherein the second RIS is the RIS serving the second device to facilitate communication between the first device and the second device, the method further comprising: identifying the third device not served by the RIS to facilitate communication between the first device and the third device.

Aspect 13: The method of aspect 11, wherein the third device is the second device, the method further comprising: identifying the second RIS not serving the second device to facilitate communication between the first device and the second device.

Aspect 14: The method of aspect 13, further comprising: identifying the RIS serving the second device to facilitate communication between the first device and the second device.

Aspect 15: The method of any one of aspects 11 through 14, wherein the RIS restriction indicator indicates one or more first time periods for the RIS to refrain from utilizing one or more RIS beams of the second RIS toward the at least one of the beam direction or the zone.

Aspect 16: The method of aspect 15, wherein the RIS restriction indicator further indicates one or more second time periods for the second RIS to utilize the one or more RIS beams toward the at least one of the beam direction or the zone.

Aspect 17: The method of aspect 15 or 16, wherein the one or more first time periods include a plurality of periodic off-durations to periodically refrain from utilizing the one or more RIS beams toward the at least one of the beam direction or the zone.

Aspect 18: A first device comprising: a transceiver configured to communicate with a radio access network, a memory, and a processor communicatively coupled to the transceiver and the memory, wherein the processor and the memory are configured to perform any one of aspects 1 through 17.

Aspect 19: A first device configured for wireless communication comprising at least one means for performing any one of aspects 1 through 17.

Aspect 20: A non-transitory computer-readable storage medium having instructions for a first device thereon, wherein the instructions, when executed by a processing circuit, cause the processing circuit to perform any one of aspects 1 through 17.

Aspect 21: A method of wireless communication by a first device, comprising: receiving a first beam configuration indicating a first set of beams of a second device and a second beam configuration indicating a second set of beams of the second device, the second set of beams being a subset of the first set of beams that excludes one or more beams of the first set of beams; receiving a reconfigurable intelligent surface (RIS) presence indicator indicating whether an activated RIS serving a second device to facilitate communication between the first device and the second device is present; performing a first beam search on the first set of beams in response to the RIS presence indicator indicating that the activated RIS is not present; and performing a second beam search on the second set of beams in response to the RIS presence indicator indicating that the activated RIS is present.

Aspect 22: The method of aspect 21, further comprising: communicating with the second device based on the first beam search when the RIS presence indicator indicates that the activated RIS is not present; and communicating with the second device based on the second beam search when the RIS presence indicator indicates that the activated RIS is present.

Aspect 23: The method of aspect 21 or 22, wherein the activated RIS is not present when no RIS serving the second device is present or when no RIS serving the second device is activated.

Aspect 24: The method of any one of aspects 21 through 23, wherein at least one of the first beam configuration, the second beam configuration, or the RIS presence indicator is received via at least one of a radio resource control (RRC) message, a media access control control element (MAC-CE), or downlink control information (DCI).

Aspect 25: The method of any one of aspects 21 through 24, wherein the first device is a first user equipment (UE) and the second device is a base station or a second UE.

Aspect 26: A first device comprising: a transceiver configured to communicate with a radio access network, a memory, and a processor communicatively coupled to the transceiver and the memory, wherein the processor and the memory are configured to perform any one of aspects 21 through 25.

Aspect 27: A first device configured for wireless communication comprising at least one means for performing any one of aspects 21 through 25.

Aspect 28: A non-transitory computer-readable storage medium having instructions for a first device thereon, wherein the instructions, when executed by a processing circuit, cause the processing circuit to perform any one of aspects 21 through 25.

Aspect 29: A method of wireless communication by a controller of a reconfigurable intelligent surface (RIS), comprising: receiving, from a first device, an RIS restriction indicator indicating at least one of a beam direction or a zone toward which to restrict use of RIS beamforming of the RIS, the at least one of the beam direction or the zone corresponding to a location of a second device; and restricting use of one or more RIS beams of the RIS toward the at least one of the beam direction or the zone based on the RIS restriction indicator.

Aspect 30: The method of aspect 29, wherein the RIS serves a third device to facilitate communication between the first device and the third device, and the second device is not served by the RIS to facilitate communication between the first device and the second device.

Aspect 31: The method of aspect 29 or 30, wherein the RIS does not serve the second device to facilitate communication between the first device and the second device.

Aspect 32: The method of aspect 31, wherein the second device is served by a second RIS to facilitate communication between the first device and the second device.

Aspect 33: The method of any one of aspects 29 through 32, wherein the first device is a base station or a first user equipment (UE) and the second device is a second UE.

Aspect 34: The method of any one of aspects 29 through 33, wherein the RIS restriction indicator indicates one or more first time periods for the RIS to refrain from utilizing one or more RIS beams of the RIS toward the at least one of the beam direction or the zone, the method further comprising: preventing the RIS from utilizing the one or more RIS beams toward the at least one of the beam direction or the zone during the one or more first time periods; and enabling the RIS to communicate using the one or more RIS beams toward the at least one of the beam direction or the zone during one or more second time periods different from the one or more first time periods.

Aspect 35: The method of aspect 34, wherein the RIS restriction indicator further indicates the one or more second time periods for the RIS to utilize the one or more RIS beams toward the at least one of the beam direction or the zone.

Aspect 36: The method of aspect 34 or 35, wherein the one or more first time periods include a plurality of periodic off-durations to periodically refrain from utilizing the one or more RIS beams toward the at least one of the beam direction or the zone.

Aspect 37: A controller of a reconfigurable intelligent surface (RIS) comprising: a transceiver configured to communicate with a radio access network, a memory, and a processor communicatively coupled to the transceiver and the memory, wherein the processor and the memory are configured to perform any one of aspects 29 through 36.

Aspect 38: A controller of a reconfigurable intelligent surface (RIS), the controller configured for wireless communication comprising at least one means for performing any one of aspects 29 through 36.

Aspect 39: A non-transitory computer-readable storage medium having instructions for a controller of a reconfigurable intelligent surface (RIS) thereon, wherein the instructions, when executed by a processing circuit, cause the processing circuit to perform any one of aspects 29 through 36.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-24 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-24 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A first device for wireless communication, comprising:
at least one processor;
a transceiver communicatively coupled to the at least one processor; and
a memory communicatively coupled to the at least one processor,
wherein the at least one processor is configured to:
perform a first transmission using a first set of beams of the first device in response to an activated reconfigurable intelligent surface (RIS) for serving a second device to facilitate communication between the first device and the second device is not being present; and
perform a second transmission using a second set of beams of the first device in response to the activated RIS being present, the second set of beams being a subset of the first set of beams that excludes one or more beams of the first set of beams.

2. The first device of claim 1, wherein the one or more excluded beams are in one or more directions toward a third device not served by the activated RIS to facilitate communication between the first device and the third device.

3. The first device of claim 2, wherein the at least one processor is further configured to:
determine the one or more beams of the first set of beams to be excluded from the second set of beams based on at least one of a location of the third device or a history of communications between the first device and the third device, wherein the one or more excluded beams are in the one or more directions toward the third device.

4. The first device of claim 3, wherein the history of communications includes at least one of a history of transmissions of data signals or a history of transmissions of a set of reference signals from the first device during a beam training to determine at least one beam of the first device corresponding to at least one reference signal with a highest signal strength observed by the third device within the set of reference signals, and
wherein the beam training includes reporting, by the third device, the at least one beam with the highest signal strength to the first device.

5. The first device of claim 1, wherein the activated RIS is not present when no RIS serving the second device is present or when no RIS serving the second device is activated.

6. The first device of claim 1, wherein the at least one processor is further configured to:
transmit, to the second device, a first beam configuration indicating the first set of beams and a second beam configuration indicating the second set of beams; and
transmit, to the second device, a RIS presence indicator indicating whether the activated RIS is present,
wherein the RIS presence indicator indicating that the activated RIS is not present is configured to cause the second device to perform a first beam search based on the first set of beams, and
wherein the RIS presence indicator indicating that the activated RIS is present is configured to cause the second device to perform a second beam search based on the second set of beams.

7. The first device of claim 6, wherein at least one of the first beam configuration, the second beam configuration, or the RIS presence indicator is transmitted via at least one of a radio resource control (RRC) message, a media access control control element (MAC-CE), or downlink control information (DCI).

8. The first device of claim 1, wherein the first device is a base station or a first user equipment (UE) and the second device is a second UE.

9. The first device of claim 1, wherein the at least one processor is further configured to:
refrain from using the one or more excluded beams during one or more first time periods during which the activated RIS is present; and perform a third transmission using the one or more excluded beams during one or more second time periods during which the activated RIS is not present.

10. The first device of claim 9, wherein the one or more first time periods include a plurality of periodic off-durations to periodically refrain from using the one or more excluded beams, and
wherein the one or more second time periods include a plurality of periodic on-durations to periodically perform the third transmission using the one or more excluded beams.

11. The first device of claim 1, wherein the at least one processor is further configured to:
identify a location of a third device; and
transmit, to a controller of a second RIS, an RIS restriction indicator indicating at least one of a RIS beam direction or a zone toward which to restrict use of RIS beamforming of the second RIS, the at least one of the RIS beam direction or the zone corresponding to the location of the second device.

12. The first device of claim 11, wherein the second RIS is the RIS serving the second device to facilitate communication between the first device and the second device, wherein the at least one processor is further configured to:
identify the third device not served by the RIS to facilitate communication between the first device and the third device.

13. The first device of claim 11, wherein the third device is the second device, and wherein the at least one processor is further configured to:
identify the second RIS not serving the second device to facilitate communication between the first device and the second device.

14. The first device of claim 13, wherein the at least one processor is further configured to:
identify the RIS serving the second device to facilitate communication between the first device and the second device.

15. The first device of claim 11, wherein the RIS restriction indicator indicates one or more first time periods for the RIS to refrain from utilizing one or more RIS beams of the second RIS toward the at least one of the beam direction or the zone.

16. The first device of claim 15, wherein the RIS restriction indicator further indicates one or more second time periods for the second RIS to utilize the one or more RIS beams toward the at least one of the beam direction or the zone.

17. The first device of claim 15, wherein the one or more first time periods include a plurality of periodic off-durations to periodically refrain from utilizing the one or more RIS beams toward the at least one of the beam direction or the zone.

18. A method of wireless communication by a first device, comprising:
performing a first transmission using a first set of beams of the first device in response to an activated reconfigurable intelligent surface (RIS) for serving a second device to facilitate communication between the first device and the second device is not being present; and
performing a second transmission using a second set of beams of the first device in response to the activated RIS is being present, the second set of beams being a subset of the first set of beams that excludes one or more beams of the first set of beams.

19. A first device for wireless communication, comprising:

at least one processor;
a transceiver communicatively coupled to the at least one processor; and
a memory communicatively coupled to the at least one processor,
wherein the at least one processor is configured to:
receive a first beam configuration indicating a first set of beams of a second device and a second beam configuration indicating a second set of beams of the second device, the second set of beams being a subset of the first set of beams that excludes one or more beams of the first set of beams;
receive a reconfigurable intelligent surface (RIS) presence indicator indicating whether an activated RIS serving a second device to facilitate communication between the first device and the second device is present;
perform a first beam search on the first set of beams in response to the RIS presence indicator indicating that the activated RIS is not present; and
perform a second beam search on the second set of beams in response to the RIS presence indicator indicating that the activated RIS is present.

20. The first device of claim 19, wherein the at least one processor is further configured to:
communicate with the second device based on the first beam search when the RIS presence indicator indicates that the activated RIS is not present; and
communicate with the second device based on the second beam search when the RIS presence indicator indicates that the activated RIS is present.

21. The first device of claim 19, wherein the activated RIS is not present when no RIS serving the second device is present or when no RIS serving the second device is activated.

22. The first device of claim 19, wherein at least one of the first beam configuration, the second beam configuration, or the RIS presence indicator is received via at least one of a radio resource control (RRC) message, a media access control control element (MAC-CE), or downlink control information (DCI).

23. A controller of a reconfigurable intelligent surface (RIS) for wireless communication, comprising:
at least one processor;
a transceiver communicatively coupled to the at least one processor; and
a memory communicatively coupled to the at least one processor,
wherein the at least one processor is configured to:
receive, from a first device, an RIS restriction indicator indicating at least one of a beam direction or a zone toward which to restrict use of RIS beamforming of the RIS, the at least one of the beam direction or the zone corresponding to a location of a second device; and
restrict use of one or more RIS beams of the RIS toward the at least one of the beam direction or the zone based on the RIS restriction indicator.

24. The controller of claim 23, wherein the RIS serves a third device to facilitate communication between the first device and the third device, and
the second device is not served by the RIS to facilitate communication between the first device and the second device.

25. The controller of claim 23, wherein the RIS does not serve the second device to facilitate communication between the first device and the second device.

26. The controller of claim 25, wherein the second device is served by a second RIS to facilitate communication between the first device and the second device.

27. The controller of claim 23, wherein the first device is a base station or a first user equipment (UE) and the second device is a second UE.

28. The controller of claim 23, wherein the RIS restriction indicator indicates one or more first time periods for the RIS to refrain from utilizing one or more RIS beams of the RIS toward the at least one of the beam direction or the zone, and wherein the at least one processor is further configured to:
   prevent the RIS from utilizing the one or more RIS beams toward the at least one of the beam direction or the zone during the one or more first time periods; and
   enable the RIS to communicate using the one or more RIS beams toward the at least one of the beam direction or the zone during one or more second time periods different from the one or more first time periods.

29. The controller of claim 28, wherein the RIS restriction indicator further indicates the one or more second time periods for the RIS to utilize the one or more RIS beams toward the at least one of the beam direction or the zone.

30. The controller of claim 28, wherein the one or more first time periods include a plurality of periodic off-durations to periodically refrain from utilizing the one or more RIS beams toward the at least one of the beam direction or the zone.

\* \* \* \* \*